United States Patent
Higuchi et al.

(10) Patent No.: US 7,620,420 B2
(45) Date of Patent: Nov. 17, 2009

(54) SIGNAL TRANSMISSION APPARATUS AND SIGNAL TRANSMISSION METHOD

(75) Inventors: Kenichi Higuchi, Yokosuka (JP);
Taisuke Ihara, Yokohama (JP);
Mamoru Sawahashi, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 518 days.

(21) Appl. No.: 10/911,522

(22) Filed: Aug. 5, 2004

(65) Prior Publication Data
US 2005/0070331 A1    Mar. 31, 2005

(30) Foreign Application Priority Data
Aug. 8, 2003    (JP)   ............................ 2003-206811

(51) Int. Cl.
*H04M 1/00*    (2006.01)
(52) U.S. Cl. .................. 455/562.1; 455/272; 455/278.1
(58) Field of Classification Search ............. 455/562.1, 455/67.6, 434, 436, 272, 278, 288
See application file for complete search history.

(56) References Cited

U.S. PATENT DOCUMENTS

| | | | | |
|---|---|---|---|---|
| 6,070,090 | A * | 5/2000 | Feuerstein | 455/561 |
| 6,330,459 | B1 * | 12/2001 | Crichton et al. | 455/562.1 |
| 6,876,870 | B2 * | 4/2005 | Hiramatsu et al. | 455/562.1 |
| 7,085,572 | B2 * | 8/2006 | Ishida | 455/450 |
| 7,146,170 | B2 * | 12/2006 | Davidson | 455/446 |
| 2002/0045432 | A1 * | 4/2002 | Yoshida | 455/276.1 |
| 2002/0177468 | A1 * | 11/2002 | Takeuchi et al. | 455/562 |
| 2002/0187813 | A1 * | 12/2002 | Guo | 455/562 |
| 2004/0198292 | A1 * | 10/2004 | Smith et al. | 455/272 |

FOREIGN PATENT DOCUMENTS

| | | |
|---|---|---|
| EP | 1 267 501 A2 | 12/2002 |
| JP | 2001-268632 | 9/2001 |
| WO | WO 2004/054153 A2 | 6/2004 |

OTHER PUBLICATIONS

Taisuke Ihara, et al., "Efficient Common Channel Transmission Employing Multi-Beam Antenns in W-CDMA Forward Link", Communication Systems, ICCS, XP-010629259, vol. 1, Nov. 25, 2002, pp. 451-455.
A. Harada, et al., "Performance of Adaptive Antenna Array Diversity Transmitter for W-CDMA Forward Link", Proc. PIMRC 99, Sep. 1999, pp. 1134-1138,.
Taisuke Ihara, et al., " Efficient Common Channel Transmission Employing Multi-Beam Antenns in W-CDMA Forward Link", ICCS 2002, pp. 5.

* cited by examiner

*Primary Examiner*—Thanh C Le
*Assistant Examiner*—Fayyaz Alam
(74) *Attorney, Agent, or Firm*—Oblon, Spivak, McClelland, Maier & Neustadt, L.L.P.

(57) ABSTRACT

A signal transmission apparatus for transmitting a signal using multiple antenna elements comprises a transmission signal generator configured to convert at least one of a first signal addressed to an arbitrary mobile terminal belonging to a geographical area and a second signal addressed to a specific mobile terminal located in a part of the geographical area into one or more transmission signals to be transmitted using a prescribed beam pattern; a weighting adjustor configured to weight said one or more transmission signals for each of the antenna elements to define the prescribed beam pattern; and a signal synthesizer provided for each of the antenna elements and configured to synthesize the weighted transmission signals.

11 Claims, 44 Drawing Sheets

ANTENNA ELEMENT 0.5 λ

0.5 λ

120°

ANTENNA ELEMENT

SIGNAL TRANSMISSION APPARATUS AND SIGNAL TRANSMISSION METHOD

BACKGROUND OF THE INVENTION

The present invention generally relates to a wireless communication technique, and more particularly, to an apparatus and a method for transmitting signals to one or more users located in a prescribed geographical area.

In the field of wireless communications, various studies are made of the next-generation communication schemes, and researches are also conducted on these communication schemes. In particular, the adaptive array antenna (AAA) technique is one of the technologies that is drawing attention because of its possibility of increasing the capacity for number of subscribers.

An adaptive array antenna includes multiple antenna elements (such as dipole antennas) arranged in an array. By adaptively controlling the weight for each of the antenna elements, the antenna gain can be increased in a specific direction. For example, the antenna gain is increased in a direction to which a signal is forwarded to a counterpart communicating node, while the antenna gain is reduced in the other directions. This arrangement allows efficient signal transmission under reduced interference, and leads to increased capacity for subscribers to be accommodated in a cell or a sector. Such an adaptive control technique is disclosed in, for example, A. Harada, S. Tanaka, M. Sawahashi, and F. Adachi, "Performance of Adaptive Antenna Array Diversity Transmitter for W-CDMA Forward Link", Proc. PIMRC 99, pp. 1134-1138, Osaka, Japan, September 1999.

Explanation is made of adaptive control in a sector as a geographical area below, and the same applies to adaptive control in a cell.

In a conventional mobile communications system (e.g., a W-CDMA mobile communications system), the downlink includes common channels and dedicated channels. On the dedicated channels, signal transmission is carried out making use of a directional beam generated by the above-described adaptive array antenna, while adapting the beam pattern for each mobile terminal. On the other hand, signals containing information in common for all the users belonging to the sector are transmitted on the common channels. Accordingly, signal transmission using a beam with strong directivity covering only a part of the sector (referred to as "directional beam transmission") is not implemented. Rather, signals are transmitted using a wide beam pattern covering the entire sector (which is referred to as "omnidirectional sector transmission").

FIG. 1 schematically illustrates a part of the conventional signal transmission apparatus. The signal transmission apparatus 100 has multiple antenna elements 102, 104 and 106 arranged close to each other. Power amplifiers 108, 110, and 112 are provided to the antenna elements 102, 104, and 106, respectively. Dedicated channels appropriately weighted by the associated weighting adjustors 114, 116, and 118 are connected to the inputs of the power amplifiers 108, 110, and 112, respectively. It should be noted that a composite signal that is a composite of the common channel and the weighted dedicated channel is input to the power amplifier 108 from the signal synthesizer 120.

In operation, signals on the dedicated channels are multiplied by appropriate weighing factors ($w_1$-$w_N$) at the weighting adjustors 114-118, amplified by the power amplifiers 108-112, and transmitted from the antenna elements 102-106, respectively, using directional beams covering only a part of the sector. The common channel is connected to the power amplifier 108 via the signal synthesizer 120, and the signal is transmitted from the antenna element 102. The other antenna elements 104 and 106 are not used for the common channel. The antenna element 102 is an omnidirectional antenna, and the signal from the common channel is transmitted using a wide beam pattern covering the entire sector (i.e., by omnidirectional sector transmission). Consequently, the common channel information is transmitted simultaneously to all the users in the sector.

Since the signal on the common channel has to be transmitted from the antenna element 102 to the overall sector, the power amplifier 108 provided to this antenna element 102 requires a greater ability of power amplification, as compared with the other power amplifiers. Assuming that 20% of transmit power is assigned to the common control channel, and that directional control is carried out for the dedicated channels using ten antenna elements evenly, then the power amplifier 108 outputs 28% of transmit power, while each of the other power amplifiers 110-112 outputs 8% of transmit power. Thus, the power amplifier 108 used for common channel signaling requires a higher amplification ability over the other power amplifiers 110-112.

However, such a power amplifier capable of outputting a high power signal occupies a lot of space, which goes against the demand for reducing the size of the signal transmission apparatus. In general, a spare power amplifier is prepared from the viewpoint of safety and maintenance of the system. The spare high power amplifier is also a large and high-power amplifier. This is also against the demand for miniaturization. This drawback becomes conspicuous as the power required to transmit the common channel (that is, the portion of the entire transmit power) increases. In addition, as the power consumed in omnidirectional sector transmission on the common channel increases, the transmit power assigned to the dedicated channels decreases. This limits the sector capacity.

To overcome this drawback, a technique for transmitting the common channel to the overall sector making use of multiple antenna elements forming the array antenna is proposed. See, for example, Ihara, et al., "Efficient Common Channel Transmission Employing Multi-Beam Antennas for Adaptive Antenna Array Transmit Diversity in W-CDMA Forward Link". With this technique, the common channel information can be transmitted over the sector via multiple antenna elements by appropriately controlling the weighting on the antenna elements. This arrangement allows an RF circuit (such as a large-size power amplifier 108) dedicated to common channel transmission to be removed.

However, the fundamental idea of transmitting the common channel across the sector is the same, even with the technique disclosed in the latter publication. The total power consumption is the same in principle, regardless of whether using a single antennal element or multiple antenna elements. Accordingly, if the power required to transmit the common channel is increased, concern about decrease of transmit power assigned to the dedicated channels still remains.

SUMMARY OF THE INVENTION

The present invention is conceived to overcome the above-described problems, and it is an object of the present invention to provide a signal transmission apparatus and a signal transmission method that can control the transmit power when transmitting a common channel by omnidirectional sector transmission to a mobile terminal located in the service area of a wireless base station.

To achieve the object, in one aspect of the invention, a signal transmission apparatus for transmitting a signal using multiple antenna elements comprises:
(a) a transmission signal generator configured to convert at least one of a first signal addressed to an arbitrary mobile terminal belonging to a geographical area and a second signal addressed to a specific mobile terminal located in a part of the geographical area into one or more transmission signals to be transmitted using a prescribed beam pattern;
(b) a weighting adjustor configured to weight said one or more transmission signals for each of the antenna elements to define the prescribed beam pattern; and
(c) a signal synthesizer provided for each of the antenna elements and configured to synthesize the weighted transmission signals.

With this arrangement, a first signal, such as a common channel, dose not have to be transmitted to the entire area of the geographical area all the time, because it can be transmitted using a prescribed beam pattern directed in a specific direction. Consequently, transmit power can be reduced.

In another aspect of the invention, a signal transmission method comprises the steps of:
(a) producing a first signal addressed to an arbitrary mobile terminal belonging to a geographical area;
(b) transmitting the first signal to the entire geographical area;
(c) acquiring location information of a mobile terminal located in a part of the geographical area;
(d) producing a second signal addressed to said mobile terminal based on the location information; and
(e) transmitting the first signal and the second signal to said part of the geographical area from multiple antenna elements using a prescribed beam pattern.

BRIEF DESCRIPTION OF THE DRAWINGS

Other objects, features, and advantages of the invention will become more apparent from the following detailed description when read in conjunction with the accompanying drawings, in which.

DETAILED DESCRIPTION OF THE PREFERRED EMBODIMENT

The present invention is described in detail below in conjunction with the attached drawings.

Figure 2:
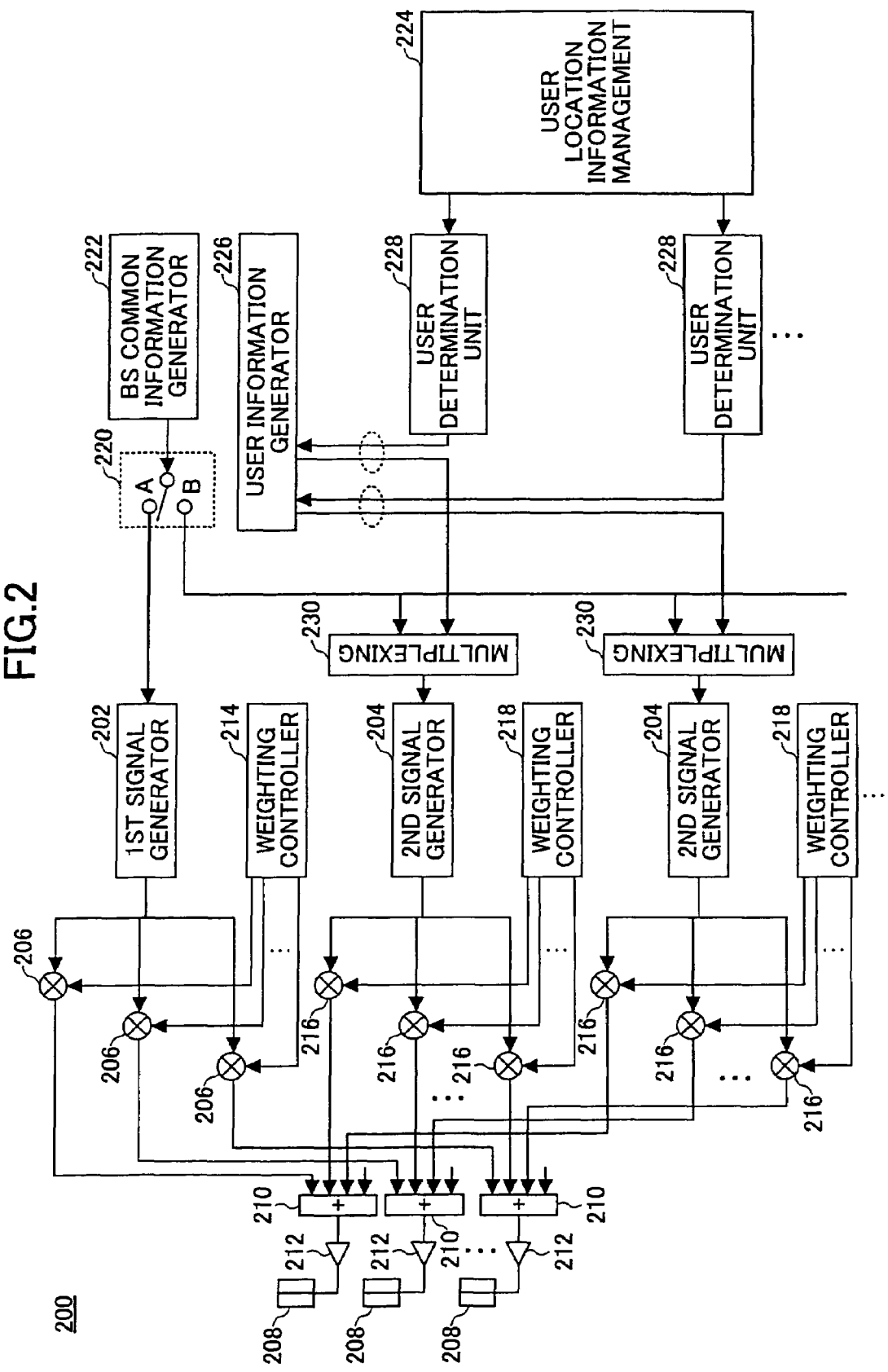
FIG. 2 is a functional block diagram of the signal transmission apparatus according to an embodiment of the invention.

FIG. 2 is a functional block diagram of a signal transmission apparatus according to an embodiment of the invention. The signal transmission apparatus 200 includes a first transmission signal generator 202 and second transmission signal generators 204. The first and second transmission signal generators 202 and 204 generate transmission signals such that these signals can be distinguished from each other by adjusting frequencies, time slots, or spread codes, the details of which will be explained later. The outputs of the first transmission signal generator 202 are connected to the weighting adjustors 206 provided to the respective antenna elements 208. The output of each of the weighting adjustors 206 is supplied to a signal synthesizer 210 provided for each of the antenna elements 208. Between the antenna element 208 and the associated signal synthesizer 210 is provided a power amplifier 212. In this example, the power amplifiers 212 provided to the respective antenna elements have the same performance of amplification. The weighting factors used in the weighting adjustors 206 are determined by the weighting controller 214.

Similarly, the outputs of the second transmission signal generators 204 are connected to the weighting adjustors 216, and the output of each of the weighting adjustors 216 is supplied to one of the signal synthesizers 210. The weighting factors used in the weighting adjustors 216 are determined by the weighting controller 218. In this embodiment, N antenna elements 208 are used, and a set of weighting factors (consisting of N weighting factors) are determined for each beam by the weighting controllers 214 and 218. The second transmission signal generators 204 are provided in accordance with the number of directional beams transmitted from the antenna elements 208.

The input to the first transmission signal generator 202 is connected to the output of a base station (BS) common information generator 222 via a switch 220. The BS common information generator 202 generates, for example, broadcast information, such as BBCH (broadcast control channel) used in a W-CDMA mobile communications system, addressed to all the users accommodated in the sector. Such broadcast information contains, for example, a cell number, scramble code of the base station, and other information.

The signal transmission apparatus 200 also includes a user location information management unit 224 that manages the locations of all the user terminals located in the sector, and a user information generator 226 that generates information as to each user. The location of the user may be estimated from the signal arriving direction or the received power of the uplink channel from the mobile terminal. Alternatively, the location information may be acquired directly from the feedback signal transmitted from the mobile terminal to the base station by determining to which beam, among multiple beams covering the sector, the feedback signal belongs. The user location information management unit 224 holds and manages all the user locations in the sector using an arbitrary method. The location information is generally expressed by two parameters defining a point in the two-dimensional plane. However, since in this embodiment the angle of direction of the mobile terminal with respect to the base station is more important than the distance from the base station to the mobile terminal, the location information may be expressed as an angle of direction. The user information generator 226 generates information for individual users, such as information for calling a specific user.

User determination units 228 are inserted between the user location information management unit 224 and the user information generator 226. The user determination unit 228 determines a user associated with a specific directional beam, based on the location information from the user location information management unit 224, and provides the determination result to the user information generator 226. The output of the user information generator 226 and the output of the switch 220 are synthesized by multiplexing units 230. The output of each multiplexing unit 230 is supplied to the associated second transmission signal generator 204.

Figure 3:
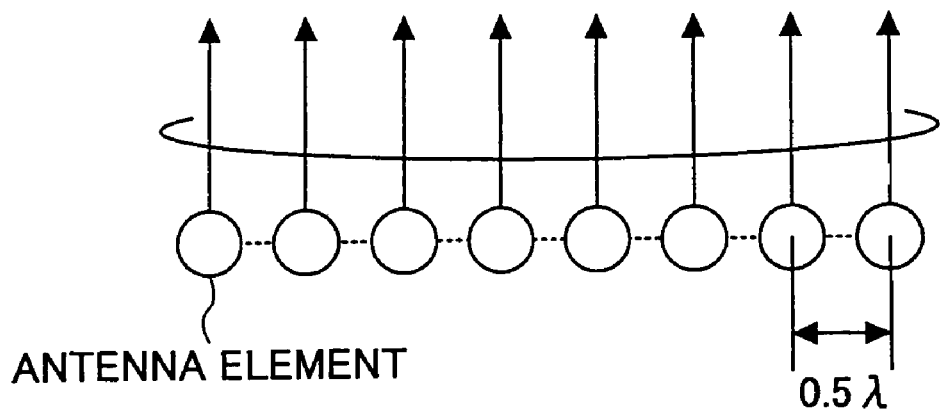
FIG. 3 shows an example of the configuration of antenna elements.
Figure 4:
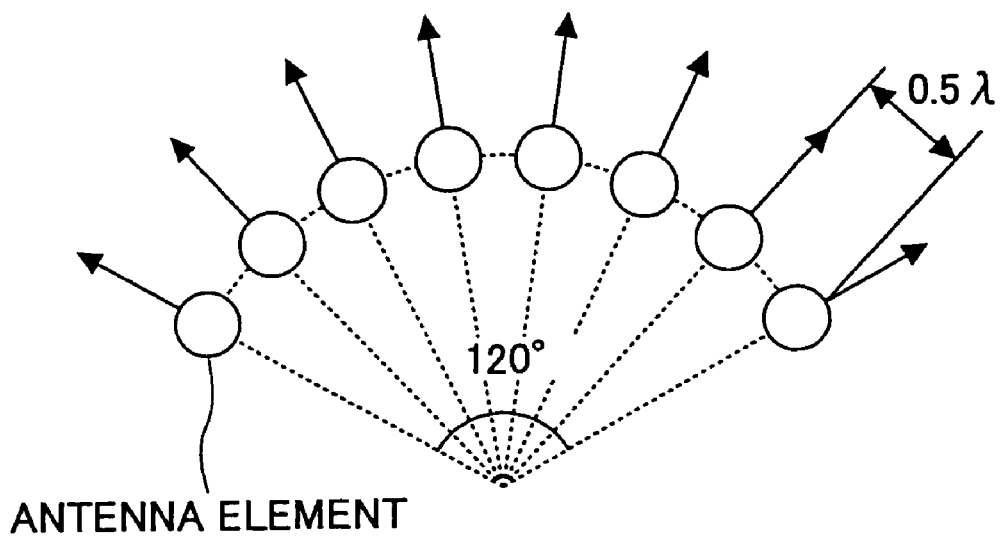
FIG. 4 shows another example of the configuration of antenna elements.

The N antenna elements 208 shown in FIG. 2 are arranged close to each other so as to form an adaptive array antenna with a predetermined configuration. FIG. 3 and FIG. 4 illustrate examples of antenna configuration. In FIG. 3, the antenna elements are arranged very closely on a line at an interval of $\lambda/2$, where $\lambda$ is the wavelength of the carrier frequency for the transmission signal. The direction of the arrow shows the direction of the main beam. In FIG. 4, antenna elements are arranged in a fan. In the examples shown in FIG. 3 and FIG. 4, eights antenna elements are used; however, an arbitrary number of antenna elements may be used. Although in this example it is assumed that the angle defining a sector is 120 degrees, the sector may be defined at other angles. The antenna elements may be arranged in different configurations, as long as the antenna elements 208 can appropriately vary the directional pattern of the beam.

Next, a method for transmitting a common channel is explained. In this embodiment, the common channel, which is used in common for all the users in the sector, may be transmitted to the entire area of the sector, or alternatively, to only a part of the sector. When transmitting to the entire area of the sector, the common channel may be transmitted by a single beam pattern defined by a set of weighting factors (consisting of N weighting factors). In this case, the first transmission signal generator 202 is used. Alternatively, the common channel may be transmitted by multiple directional beams, using second transmission signal generators 204. In the below, explanation is made of transmission of the common channel using a single beam pattern realized by N weighting factors using the first transmission signal generator 202. The concept of transmitting the common channel to the entire area of the sector using N antenna elements and N weighting factors is disclosed in the above-described publication "Efficient Common Channel Transmission Employing Multi-Beam Antennas for Adaptive Antenna Array Transmit Diversity in W-CDMA Forward Link".

A common channel associated with all the users in the sector is generated by the BS common information generator 222. When omnidirectional sector transmission of the common channel is carried out, the switch 220 is connected to terminal A, and the common channel is supplied to the first transmission signal generator 202. The first transmission signal generator 202 converts the common channel into a transmission signal, which is to be transmitted using a predetermined beam pattern. This transmission signal is generated so as to be distinguishable from other signals transmitted from the antenna elements 208, by adjusting frequencies, time slots, spread codes, or combinations thereof. The outputs of the first transmission signal generator 202 are appropriately weighted for the respective antenna elements, supplied to the signal synthesizers 210, and transmitted from the antenna elements 208.

The switching operation of the switch 220 is carried out periodically in a prescribed time slot, or alternatively, it may be performed in response to a certain control signal. Although the switch 220 is illustrated so as to select either terminal A or B, the first transmission signal generator 202 does not necessarily vary its output signals in response to the absence or the presence of the input signal through the switch 220. The first transmission signal generator 202 may continuously output the same information even after switching from terminal A to terminal B at the switch 220.

The beam pattern of the signal to be transmitted by radio waves is determined depending on the weighting factor $W^{(n)}$ set by the weighting adjustor 206 and the weighting controller 214, where n denotes the n-th antenna element ($1 \leq n \leq N$). The weighting factor $W^{(n)}$ is expressed by $$W^{(n)} = \frac{1}{M}\sum_{m=1}^{M} W^{(n,m)} = \frac{1}{M\sqrt{N}}\sum_{m=1}^{M} \exp[j \cdot \pi(n-1)\sin(\theta_m)] \quad (1)$$

where $\theta m$ indicates the direction of the main lobe of a directional beam, and m is an integer satisfying $1 \leq m \leq M$. The index M is the number of directional beams to be superposed, and in this embodiment, M is assumed to be eight (M=8). By superposing eight directional beams whose main lobes turn to different directions, a beam pattern that covers the entire area of a sector (120 degrees) is transmitted. For example, the directional beams are expressed as $$\{\theta m\}_{m=1-8} = \{-52.5, -37.5, -22.5, -7.5, +7.5, +22.5, +37.5, +52.5\}.$$

In this example, the averaged weighting factor expressed by equation (1) is used. However, the weighting factors that implement a beam pattern covering the entire area of the sector are not limited to this example. For example, orthogonal beam formation disclosed in R. C. Hanse, Phased Array Antenna, John Wiley and Sons, 1998 may be employed. Instead of superposing multiple directional beams, weighting factors may be estimated so as to allow the antenna gain to be substantially constant in the entire area of the sector. From the viewpoint of facilitating the weighting control, it is desired to set weighting factors based on equation (1).

Figure 5:
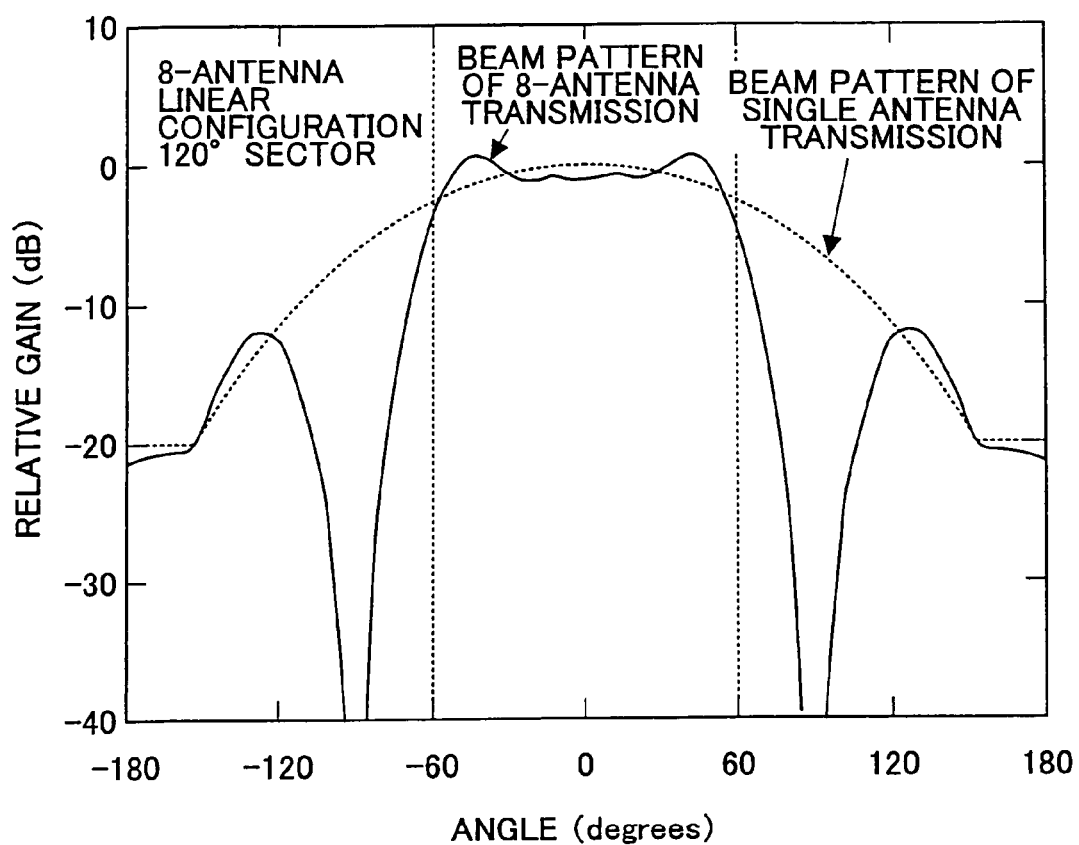
FIG. 5 is a graph of the simulation result of antenna gain obtained with the linear configuration of the antenna elements shown in FIG. 3.
Figure 6:
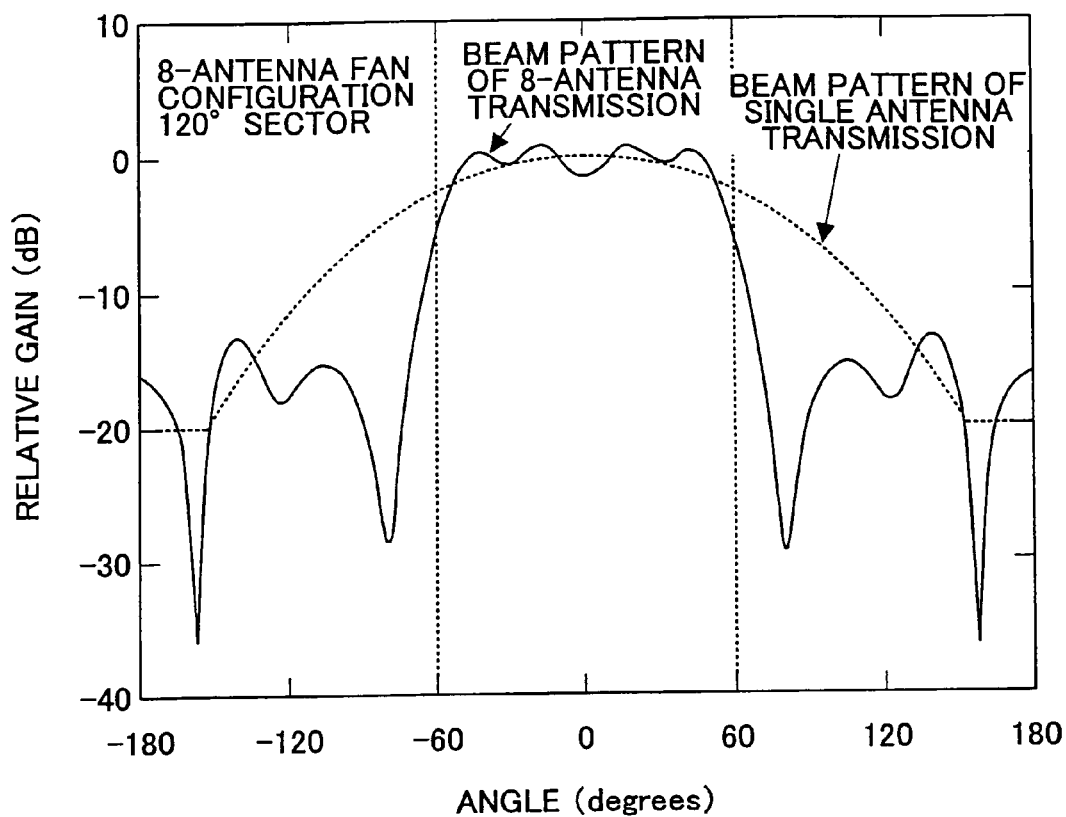
FIG. 6 is a graph of the simulation result of antenna gain obtained with the fan configuration of the antenna elements shown in FIG. 4.

FIG. 5 is a graph showing the simulation result of antenna gain when forming a beam pattern of the common channel using the weighting factors defined by equation (1) with the linear antenna configuration shown in FIG. 3. The beam pattern (antenna gain) formed by eight directional beams is indicated by the solid line. The antenna gain (beam pattern) obtained with the conventional technique using a single antenna element is illustrated by the dashed line for comparison. FIG. 6 is a graph showing the simulation result of antenna gain with the fan antenna configuration shown in FIG. 4. As is clearly shown in FIG. 5 and FIG. 6, the beam pattern formed by eight antenna elements covers the range of 120 degrees (from −60 degrees to +60 degrees) similarly to the transmission pattern using a single antenna element.

Figure 1:
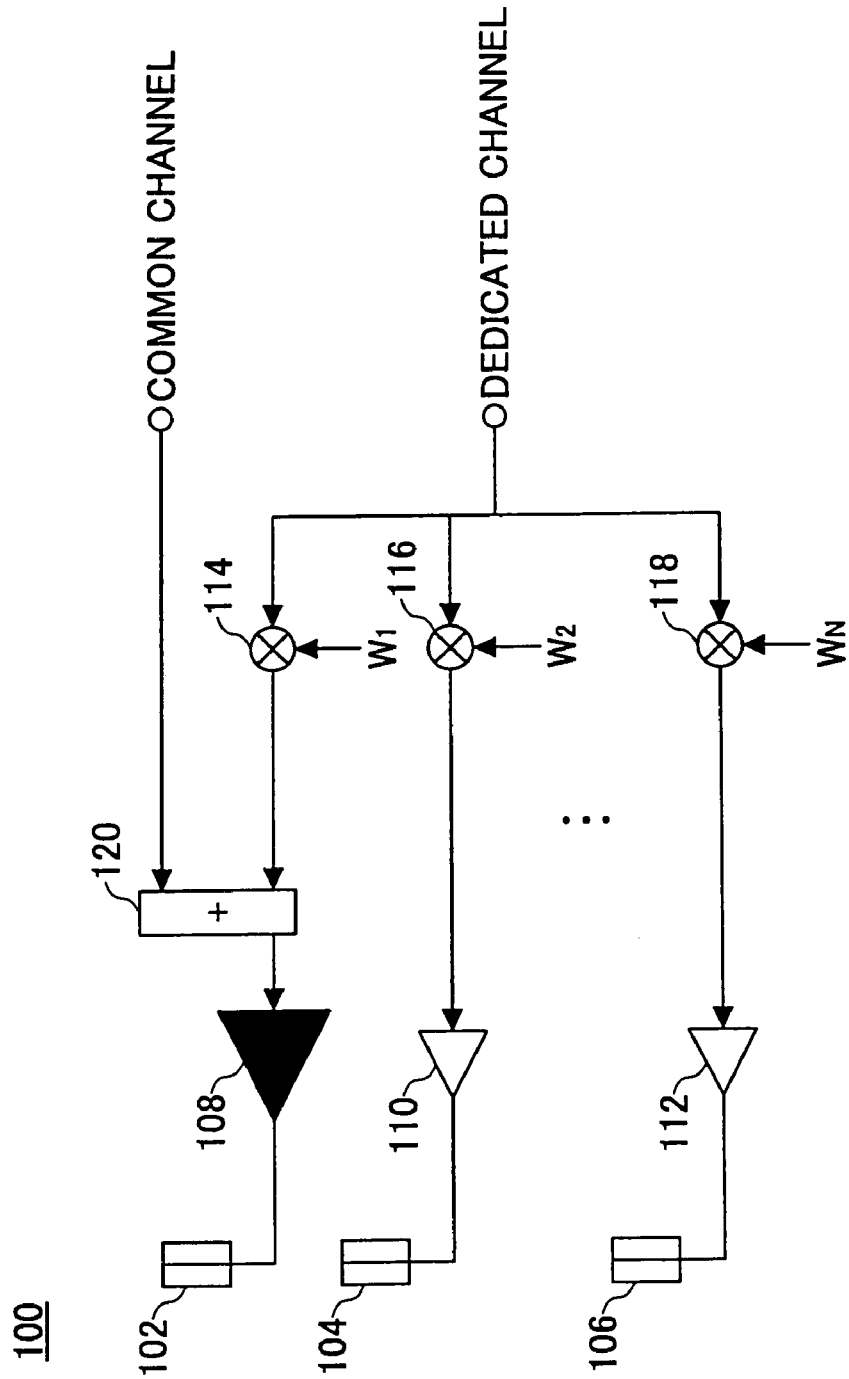
FIG. 1 illustrates a part of a conventional signal transmission apparatus.

With this method, the common channel is transmitted using a beam pattern that covers the entire area of the sector, making use of multiple antenna elements, and therefore, concentration of excessive workload on a specific power amplifier can be avoided. Since a large-size power amplifier 108 used in the conventional apparatus illustrated in FIG. 1 is eliminated, the same performance level can be given to all the power amplifiers 212 provided for the respective antenna elements 208. Thus, the signal transmission apparatus can be made compact.

The concept of transmitting the common channel using multiple antenna elements under appropriate weighting can be expanded to apply to transmitting the common channel using various beam patterns, including a wide beam pattern and a narrow beam pattern, by adjusting the weighting factors.

Figure 7A:
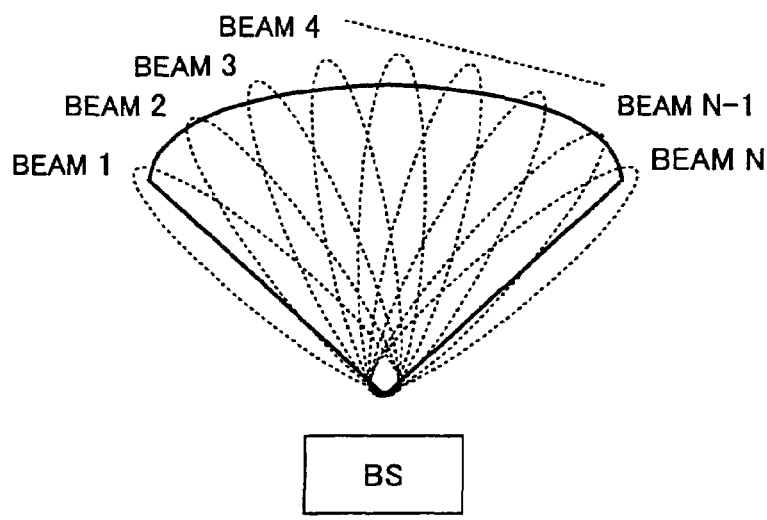
FIG. 7 illustrates various beam patterns.
Figure 7C:
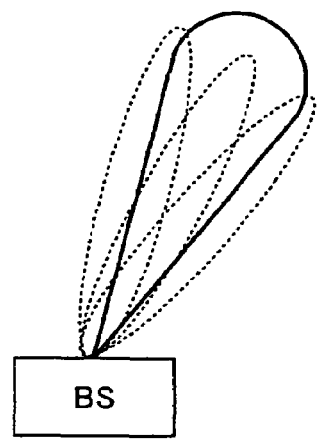
Figure 7B:
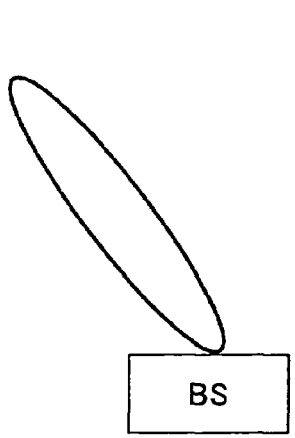

FIG. 7A through FIG. 7D illustrate various beam patterns created using multiple antenna elements by adjusting the weighting factors. The beam pattern depicted by the bold line in FIG. 7A is created by superposing N directional beams, and it can cover the entire area of a sector. This beam pattern can be used to perform omnidirectional sector transmission using multiple antenna elements. The beam pattern illustrated in FIG. 7B has a strong directivity with the main lobe turning to a specific direction. By focusing the transmission beam on the specific direction, the transmit power can be reduced. The beam pattern shown in FIG. 7C is in between the beam patterns of FIG. 7A and FIG. 7B. This type of beam pattern can be formed by adjusting the type and the number of directional beams to be superposed. The beam pattern of FIG. 7C is created by, for example, superposing three directional beams having the main lobe in directions $\theta 4$, $\theta 5$, and $\theta 6$ defined by equation (1).

Signals contained in the common channel include information to be transmitted to all the mobile terminals currently belonging to the sector. An example of such information is a primary-common control physical channel (P-CCPCH) used in W-CDMA mobile communications systems. For this reason, the common channel is transmitted to the entire area of the sector. However, if the user distribution in the sector can be known at the signal transmission apparatus of the base station, omnidirectional sector transmission (shown in FIG. 7A) of the common channel can be avoided, and instead, an appropriate beam pattern (illustrated in FIG. 7B or 7C) can be selected to transmit the common channel. Avoiding omnidirection transmission to the entire area of the sector is advantageous because the transmit power previously consumed by the omnidirectional sector transmission can be assigned to individual channels, and consequently, the sector capacity can be increased.

Figure 7D:
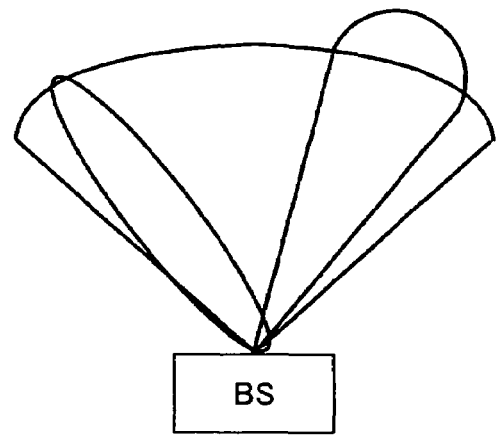

In addition, two or more common channels can be transmitted using different beam patterns, as illustrated in FIG. 7D. When multiplexing beam patterns, each beam pattern has to be identified based on some factors, such as frequencies, time slots, spread codes, or combinations thereof. The details about such factors are explained below.

Figure 8:
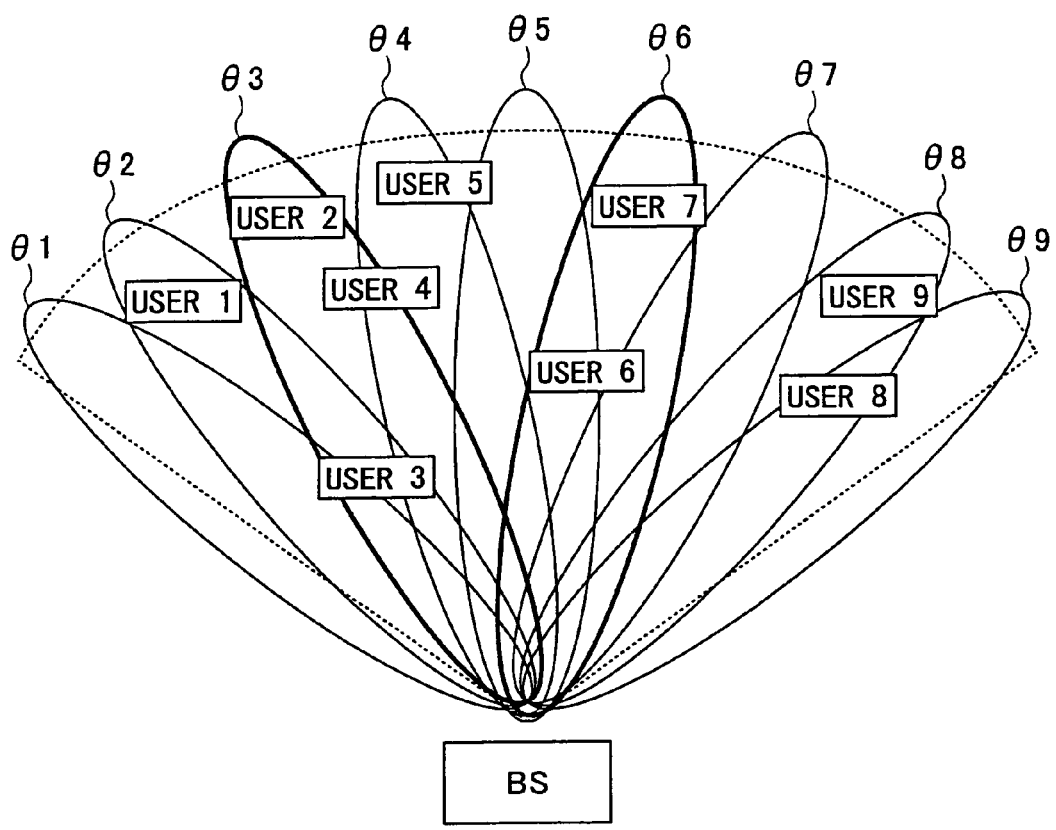
FIG. 8 illustrates multiplexed common channels transmitted to many different sections according to an embodiment of the invention.

Explanation is made of transmission of multiple common channels, all or a part of which common channels are different from each other, using multiple directional beams depending on the user distribution in the sector, with reference to FIG. 2 and FIG. 8. In FIG. 8, common channels are transmitted using nine beam patterns $\theta 1$ to $\theta 9$ having different directivities. The weighting factors of the beam patterns are determined such that the entire area of the sector (indicated by the dashed line) is covered by these beam patterns. Users 1 and 3 belong to beam pattern $\theta 2$, users 2, 3, and 4 belong to beam pattern $\theta 3$, user 5 belongs to beam pattern $\theta 4$, users 6 and 7 belong to beam pattern $\theta 6$, and users 8 and 9 belong to beam pattern $\theta 8$.

The location of each user is figured out by the user location information management unit 224. The location or the direction of the user can be estimated by, for example, measuring the direction of the arriving wave of the uplink signal transmitted from the user terminal at the signal transmission apparatus (of the base station). Alternatively, the location information may be acquired by receiving direct information as to by which beam pattern the user is currently covered. In any case, the user location information management unit 224 possesses information about the users and their locations (or the directions from the base station), and supplies the information to the user determination units 228.

The user determination units 228 are provided according to the number of the directional beams transmitted from the signal transmission apparatus 200. Each of the user determination units 228 figures out which users belong to the associated beam pattern (one of the beam patterns θ1 through θ9). For example, the user determination unit 228 assigned to the beam pattern θ3 figures out that users 2, 3, and 4 are located in the area covered by beam pattern θ3 based on the user location information supplied from the user location information management unit 224. Then, the user determination unit 228 requests the user information generator 226 to output the information items about the users 2, 3, and 4. In response to the request, the user information generator 226 outputs the information items about the individual users 2, 3, and 4 if there are any, and supplies the information items to the multiplexing units 230. The information items are then subjected to the signal processing at the second transmission signal generators 204, weighted by the associated weighting adjustors 216 and the weighting controllers 218, and transmitted by a beam pattern determined by the weighting factors, using the multiple antenna elements 208.

In addition to the information addressed to individual users 2, 3 and 4, common information generated by the BS common information generator 222 for all the users may also be multiplexed at each of the multiplexing units 230 before such information is supplied to the associated second transmission signal generator 204. The signal containing the information addressed to all the users may be transmitted using individual beam patterns, in addition to or in place of omnidirectional sector transmission of the common channel for all the users. For example, as to the beam pattern θ3, information items about specific users (users 2, 3, and 4) and the common information addressed to all the users (users 1-9) in the sector are multiplexed, and transmitted using this beam pattern θ3. Similarly, for the beam pattern θ6, the information items relating to users 6 and 7 and the common information addressed to all the users in the sector are multiplexed and transmitted using this beam pattern θ5. The same applies to other beam patterns. In this manner, the common channel may not necessarily be transmitted to the entire area of the sector. Determination whether the signals from the BS common information generator 222 are to be input to the first transmission signal generator 202 or the second transmission signal generators 204 is made by operation of the switch 220, depending on the contents of the signal to be transmitted or the distribution of the mobile terminals.

When multiplexing different beam patterns, each beam has to be identified or distinguished from the others, using some factors. Frequencies, time slots, and spread codes may be used as such factors, as well as the directivities. To be more precise, the first transmission signal generator 202 and/or the second transmission signal generators 204 carry out signal processing such that signals are transmitted from the antenna elements at different frequencies or different time slots, or after the spectra are spread using different spread codes. Various examples of identification of beam patterns are illustrated in FIG. 9 through FIG. 40.

Figure 9:
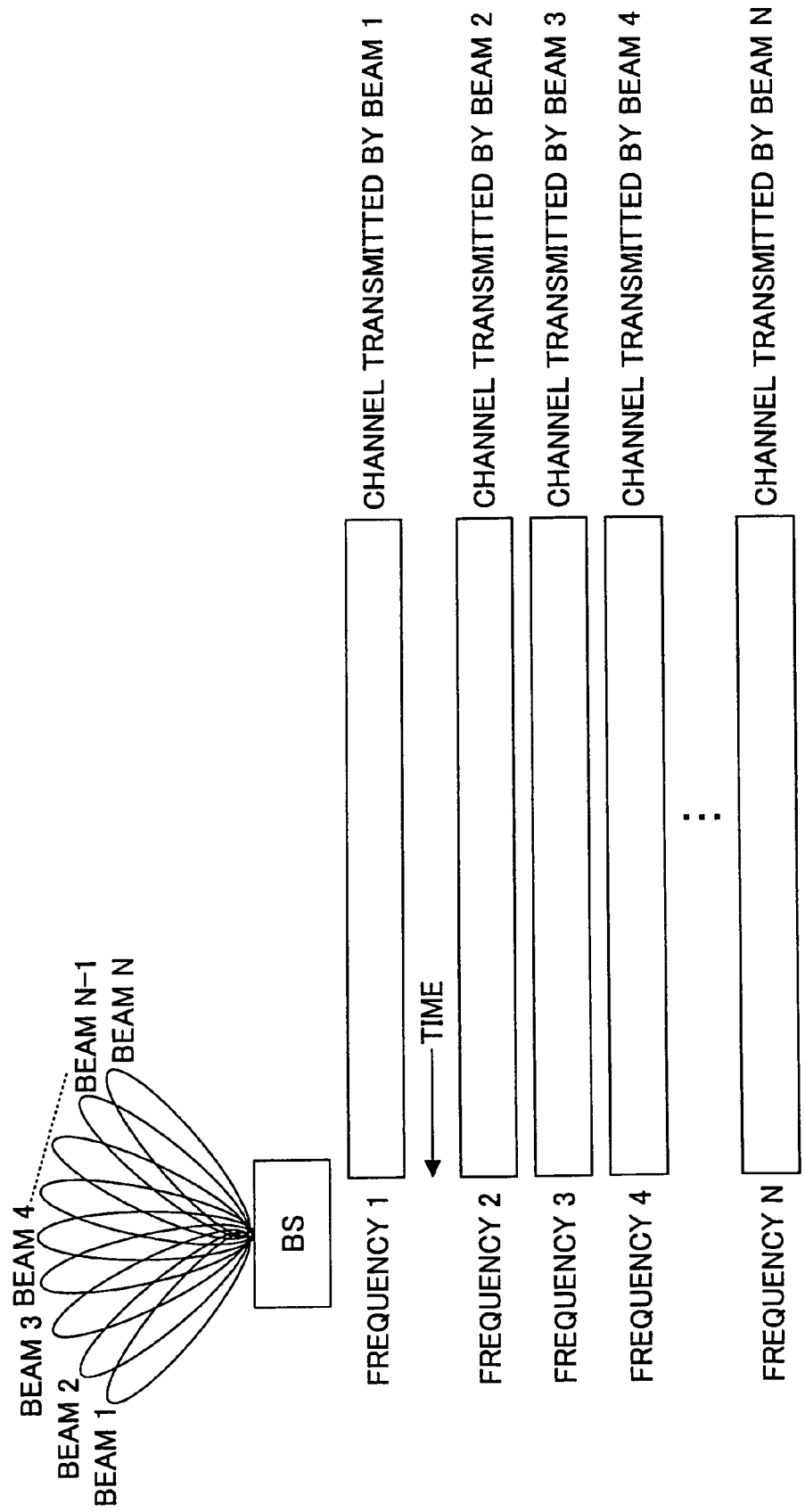
FIG. 9 shows an example of multiplexing directional beams.
Figure 10:
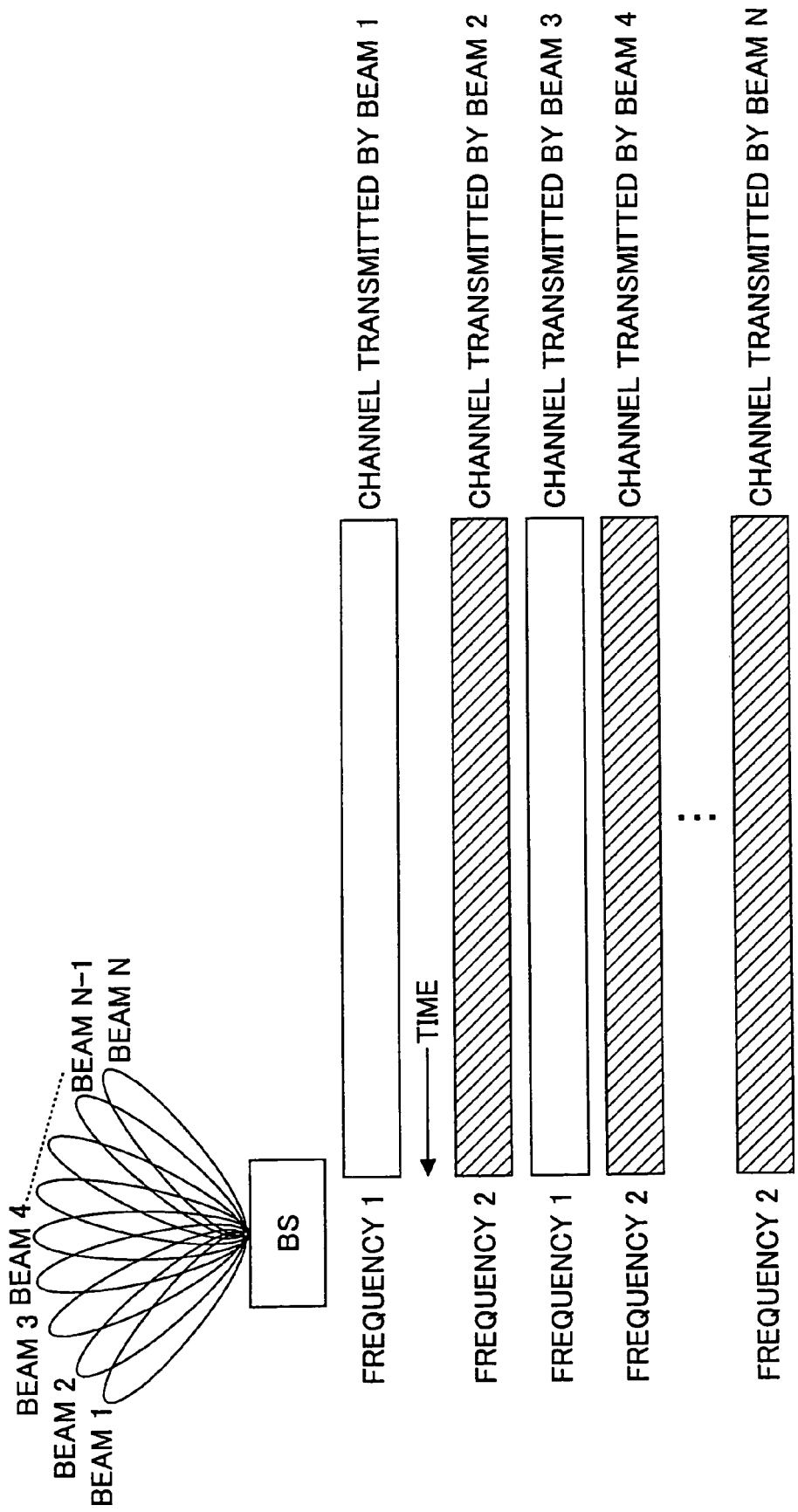
FIG. 10 shows another example of multiplexing directional beams.

FIG. 9 and FIG. 10 illustrate examples in which the beams are distinguished from each other by varying the frequency. The directional beam patterns are generated by the second transmission generators 204 (see FIG. 2). In FIG. 9, all the frequencies for N directional beams differ from one another. The user detects the (frequency of) the arriving common channel, and receives the broadcast information contained in the common channel. The frequency of the arriving common channel can be detected using a known method, such as making use of synchronization. In FIG. 10, two different frequencies are used alternately. Each of the two frequencies is assigned to every other beam. When using beam patterns with sufficiently different directivities, interference is reduced spatially, and accordingly, two different frequencies can be used repeatedly. This arrangement improves use efficiency of the radio resources.

Figure 11:
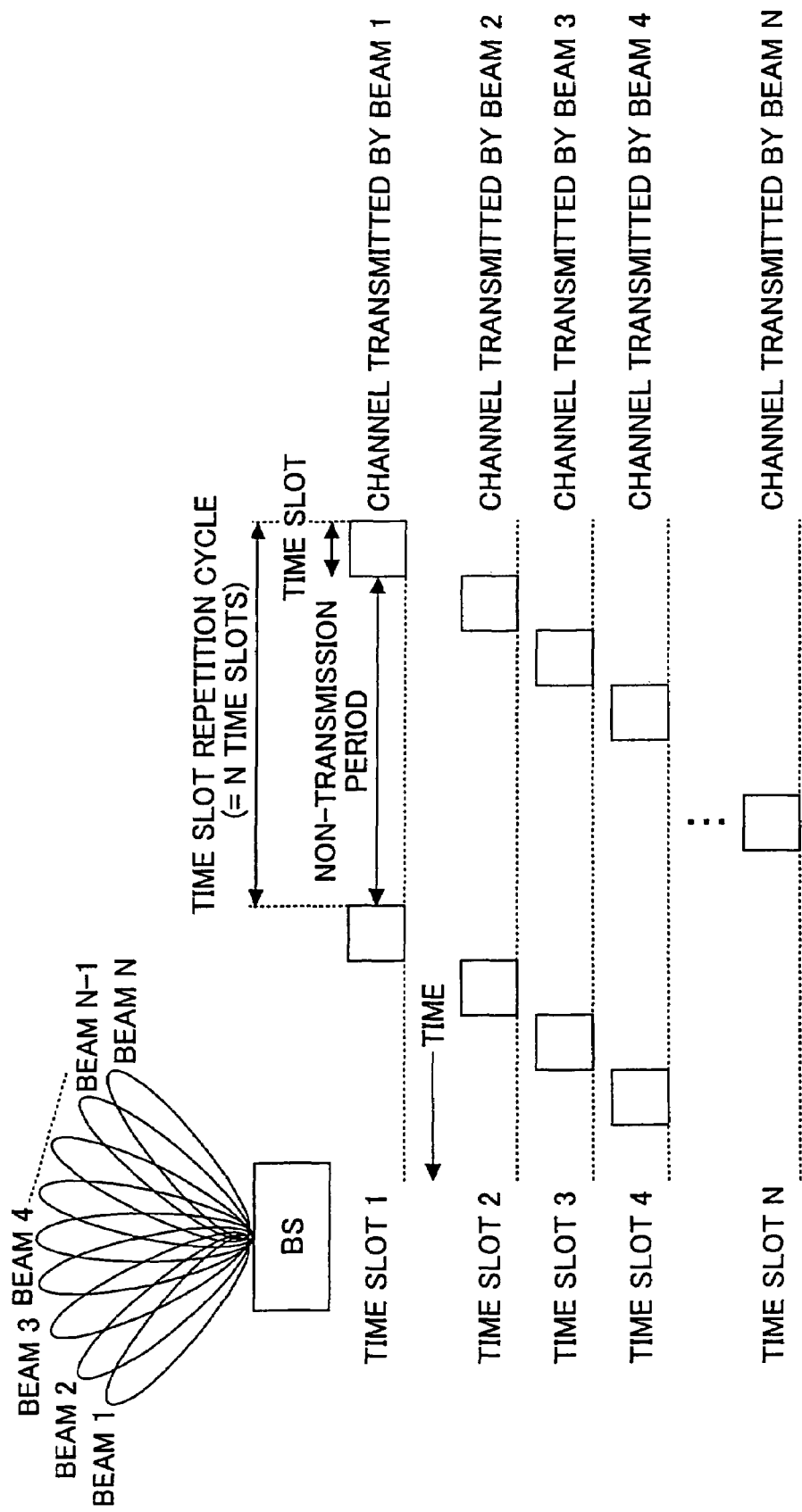
FIG. 11 shows still another example of multiplexing directional beams.
Figure 12:
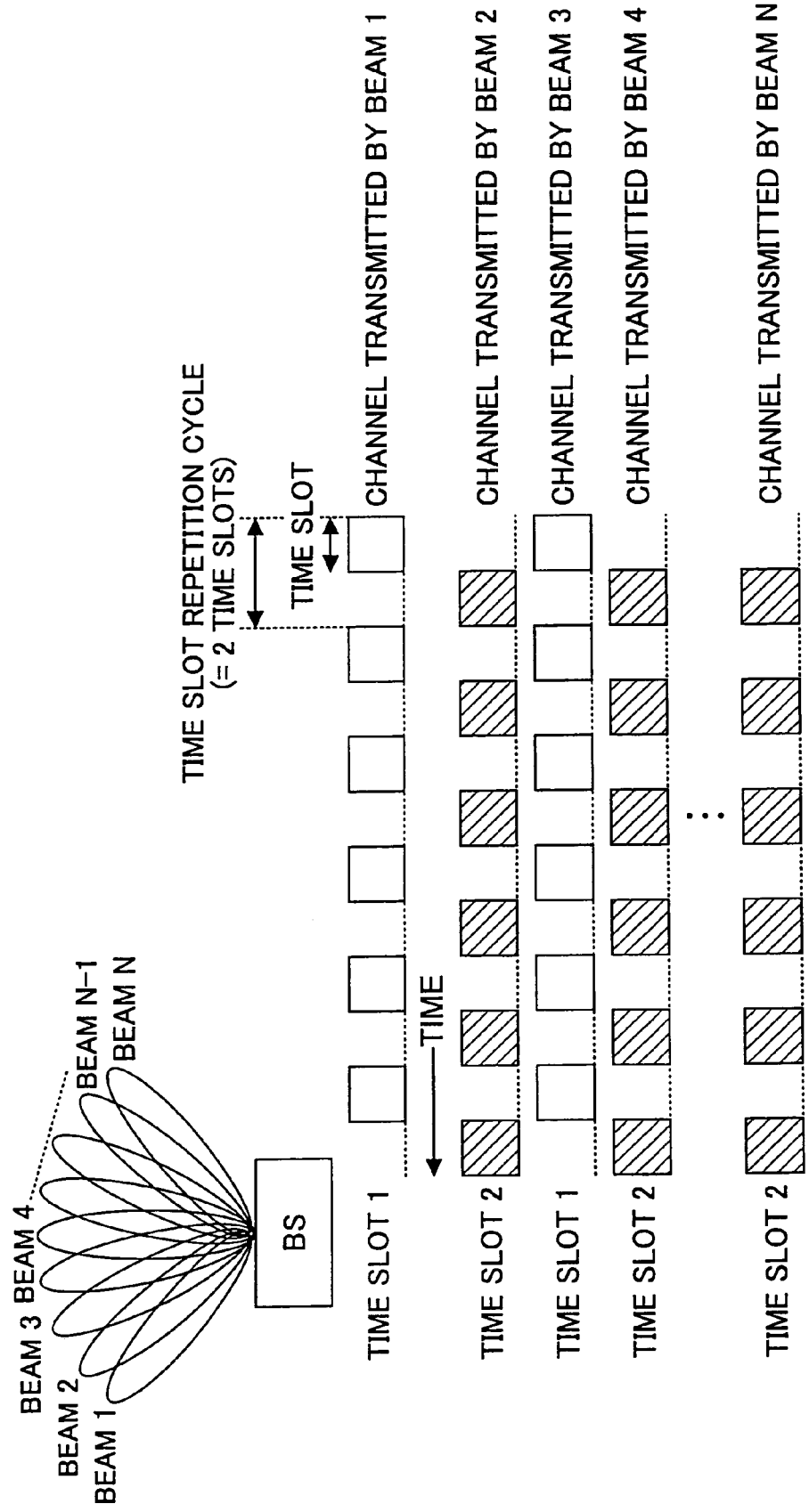
FIG. 12 shows yet another example of multiplexing directional beams.

FIG. 11 and FIG. 12 illustrate examples in which the beams are distinguished from each other by varying time slot. The directional beams that are to be transmitted at different time slots are generated by the second transmission generators 204. In FIG. 11, all the time slots assigned to N directional beams differ from each other. In FIG. 12, two different time slots are used alternately, making use of sufficiently different directivities of the beam patterns. Each of the two time slots is assigned to every other beam. This arrangement improves the throughput (transmission rate). The user receives information contained in the common channel by detecting the time slot of the arriving common channel. The time slot can be detected by an appropriate known method.

Figure 13:
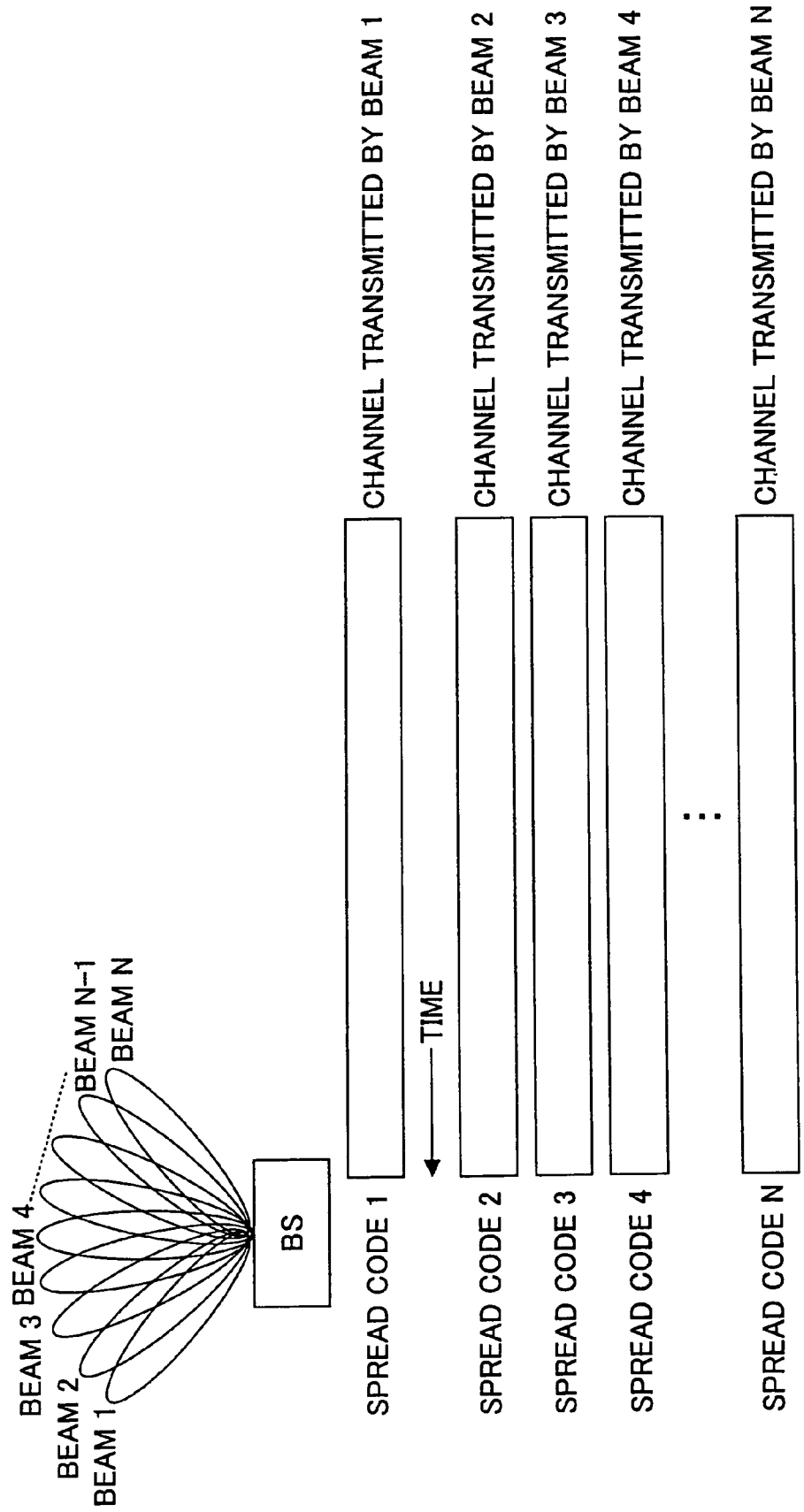
FIG. 13 shows yet another example of multiplexing directional beams.
Figure 14:
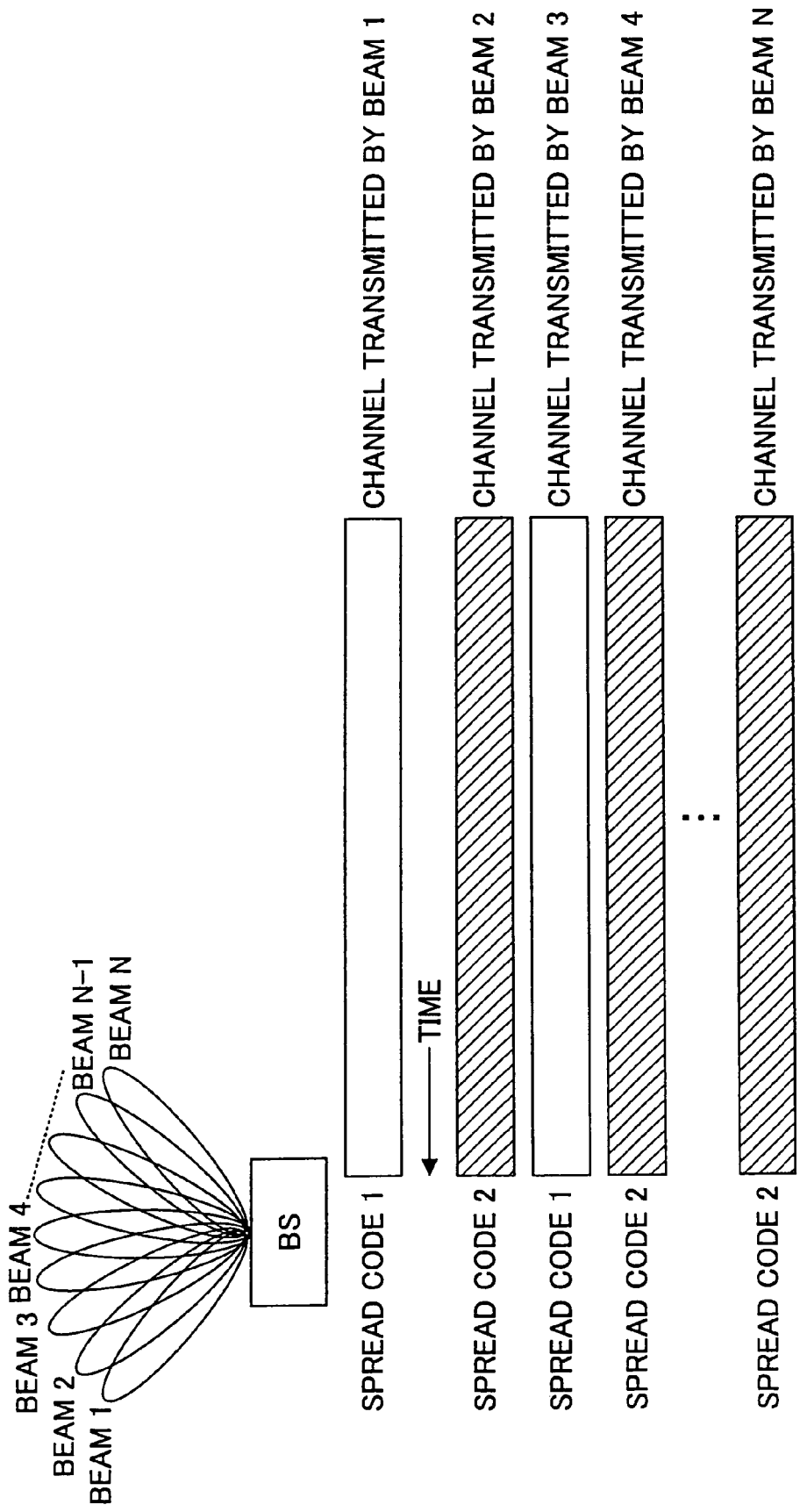
FIG. 14 shows yet another example of multiplexing directional beams.

FIG. 13 and FIG. 14 illustrate examples in which the beams are distinguished from each other, using different spread codes. The directional beams whose spectra have been spread using different spread codes are generated by the second transmission generators 204. In FIG. 13, the spread codes used for spectrum spreading of N signals are all different. In FIG. 14, two different spread codes are used alternately, making use of sufficiently different directivity of the beams. Each of the two spread codes is assigned to every other beam. By using two spread codes repeatedly, the use efficiency of resources can be improved. The user detects the spread code of the arriving common channel, and receives the information contained in the common channel. The spread code can be detected using any known method.

Figure 15:
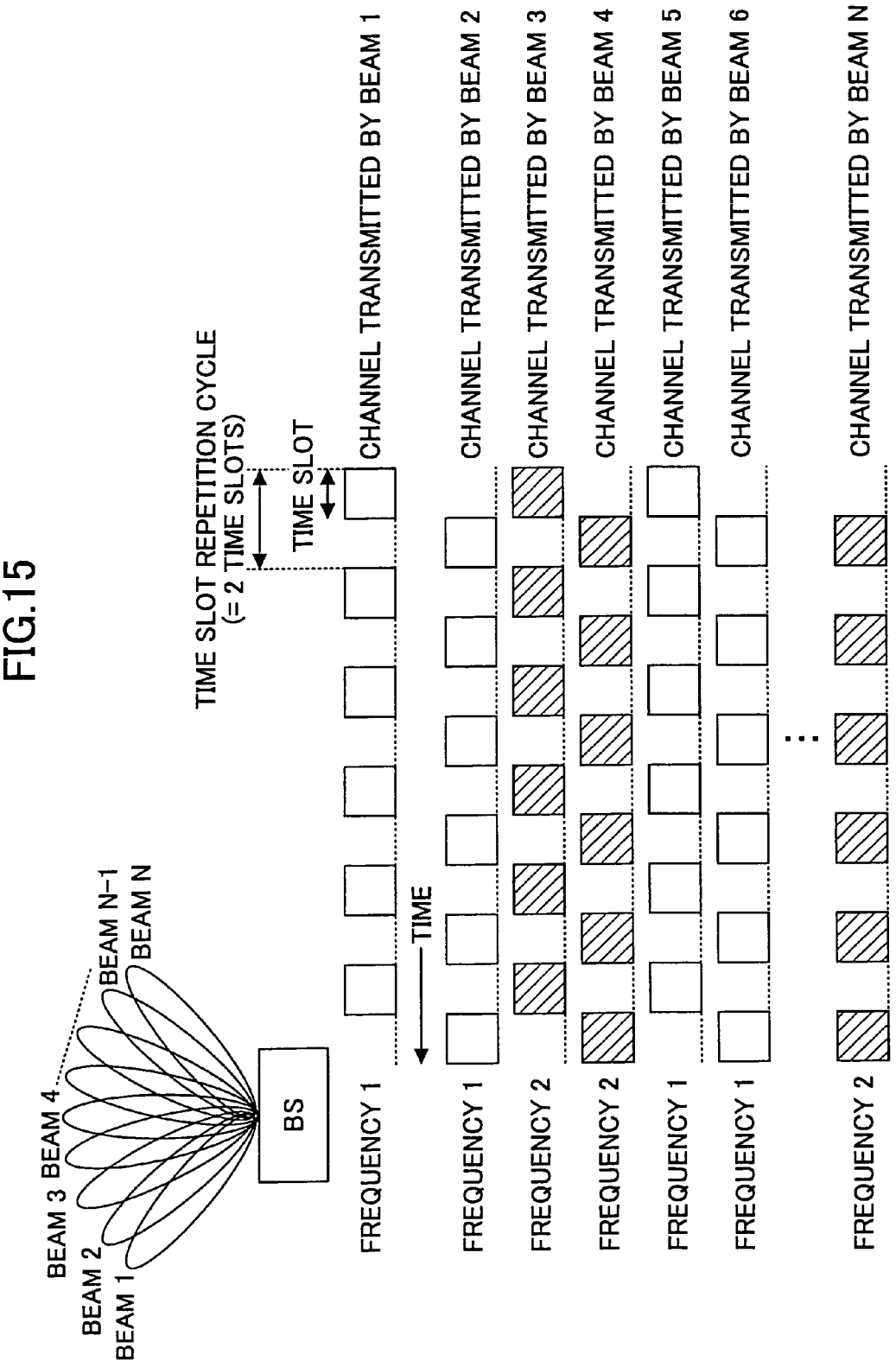
FIG. 15 shows yet another example of multiplexing directional beams.
Figure 16:
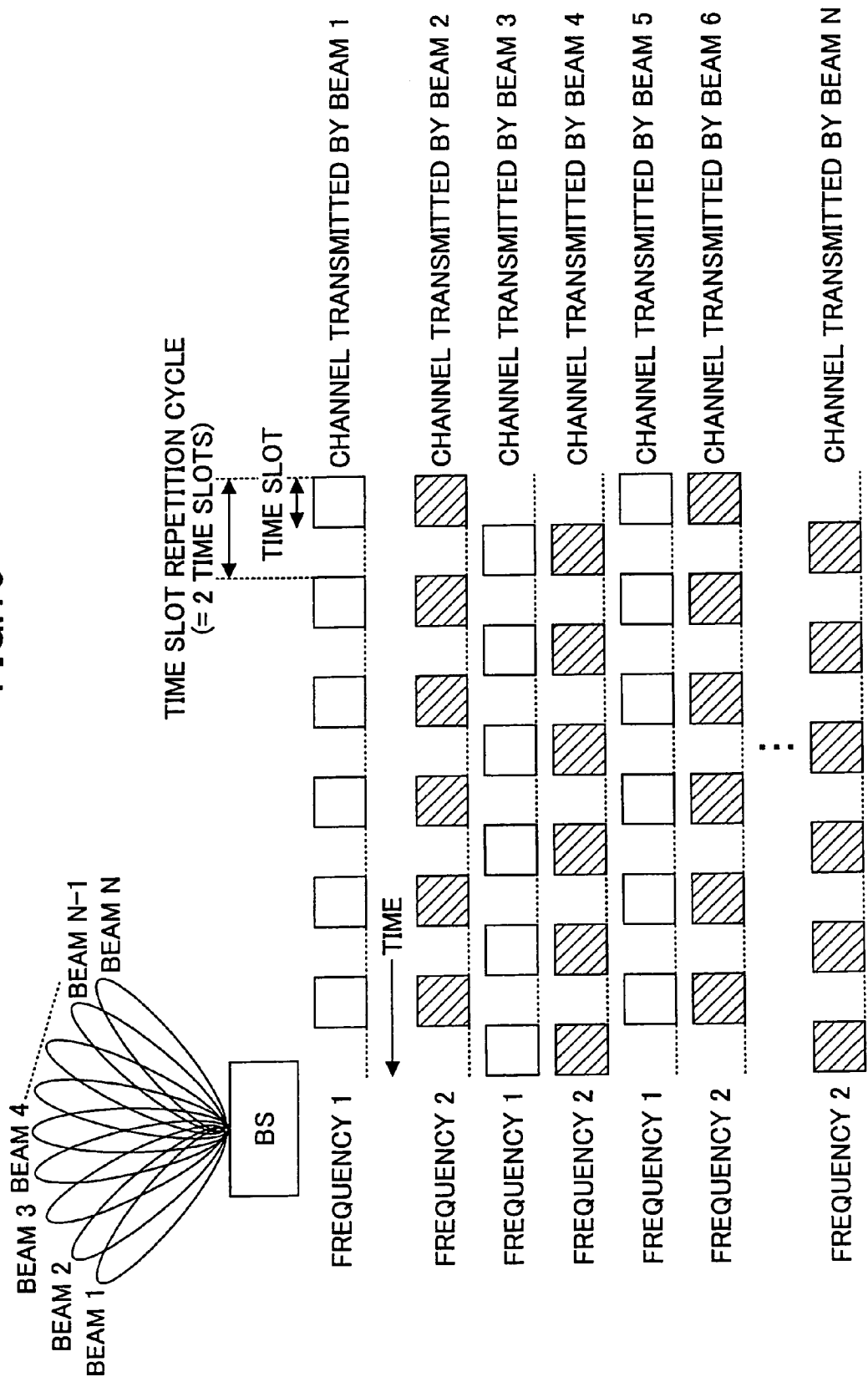
FIG. 16 shows yet another example of multiplexing directional beams.
Figure 17:
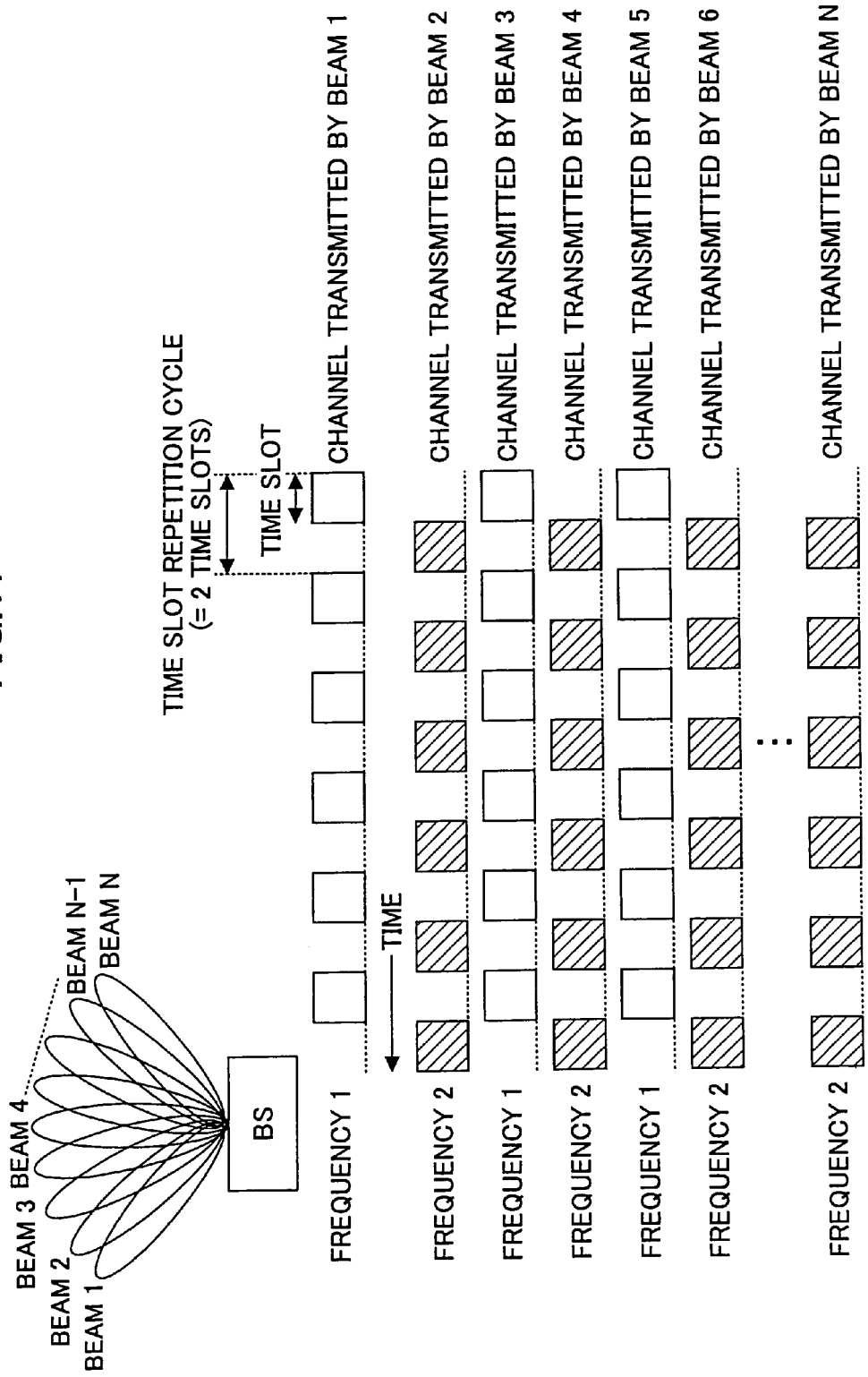
FIG. 17 shows yet another example of multiplexing directional beams.

FIG. 15, FIG. 16, and FIG. 17 illustrate examples in which the beams are distinguished from each other, using different frequencies and different time slots. Each of such beams is produced by the second transmission signal generator 204 (FIG. 2). In FIG. 15, a pair of beams to be transmitted in different time slots, but at the same frequency (frequency 1), are generated. Another pair of beams to be transmitted in different time slots, but at another frequency (frequency 2), are also generated. These two pairs of beams are used repeatedly. Consequently, the same time slot and the same frequency are assigned to every fourth beam. In FIG. 16, a pair of beams to be transmitted using different frequencies (frequency 1 and frequency 2), but in the same time slot, are generated. Another pair of beams to be transmitted using different frequencies, but in another time slot, are also generated. These two pairs of beams are used repeatedly. The same time slot and the same frequency are assigned to every fourth beam. In FIG. 17, a pair of beams to be transmitted using different frequencies in different time slots are generated, and these two types of beams are used repeatedly. In other words, every other beam is transmitted at the same frequency and in the same time slot.

Figure 18:
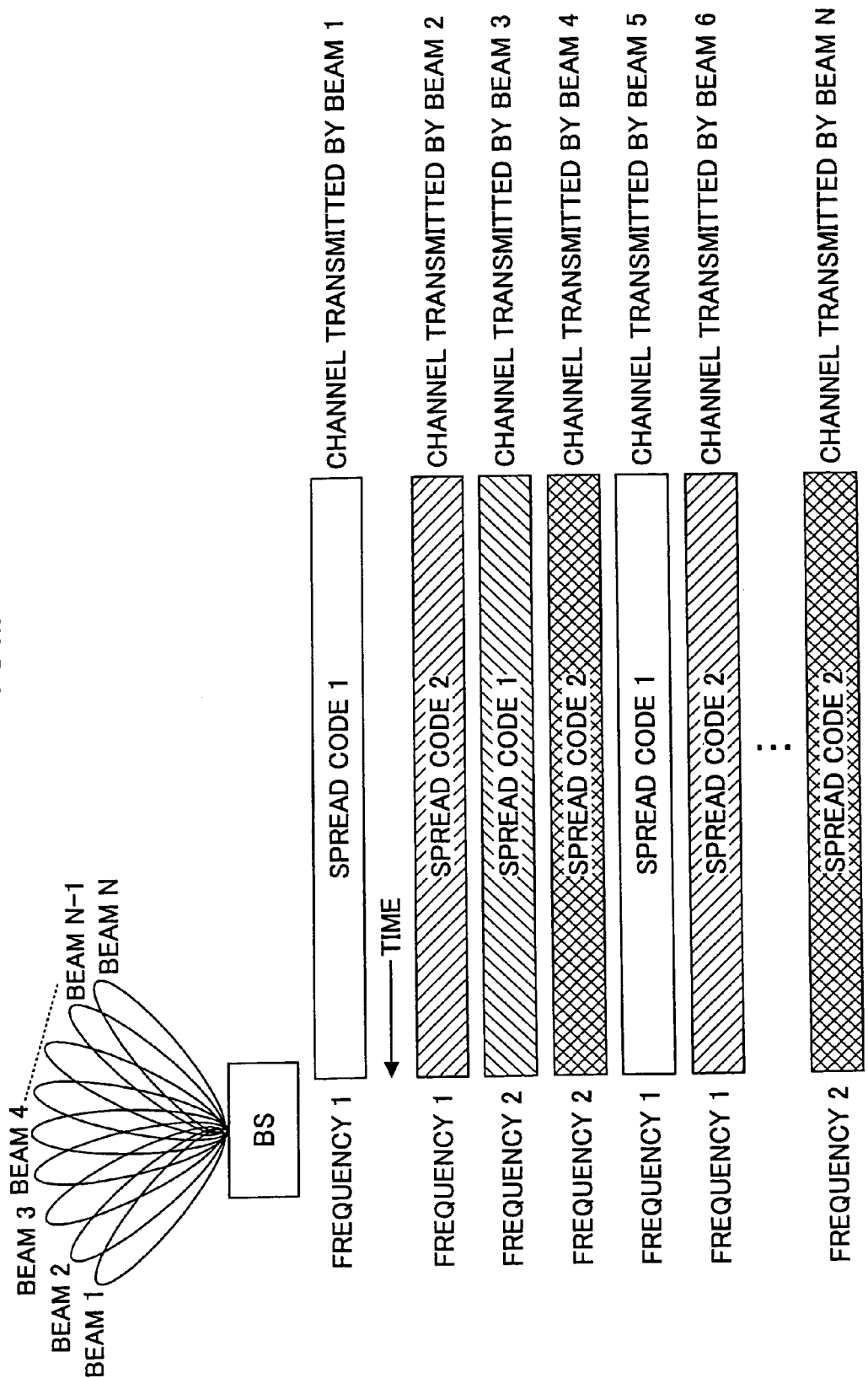
FIG. 18 shows yet another example of multiplexing directional beams.
Figure 19:
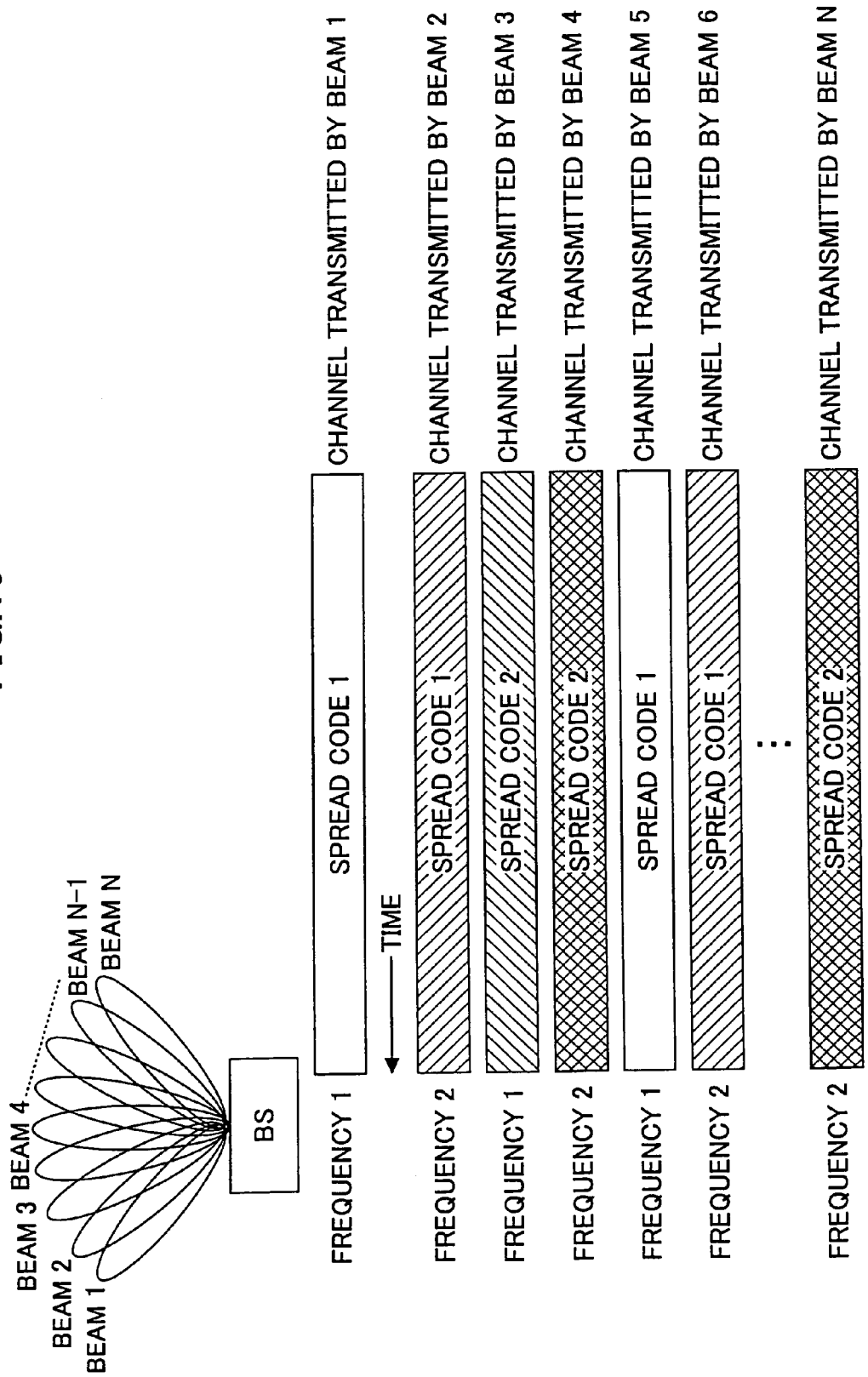
FIG. 19 shows yet another example of multiplexing directional beams.
Figure 20:
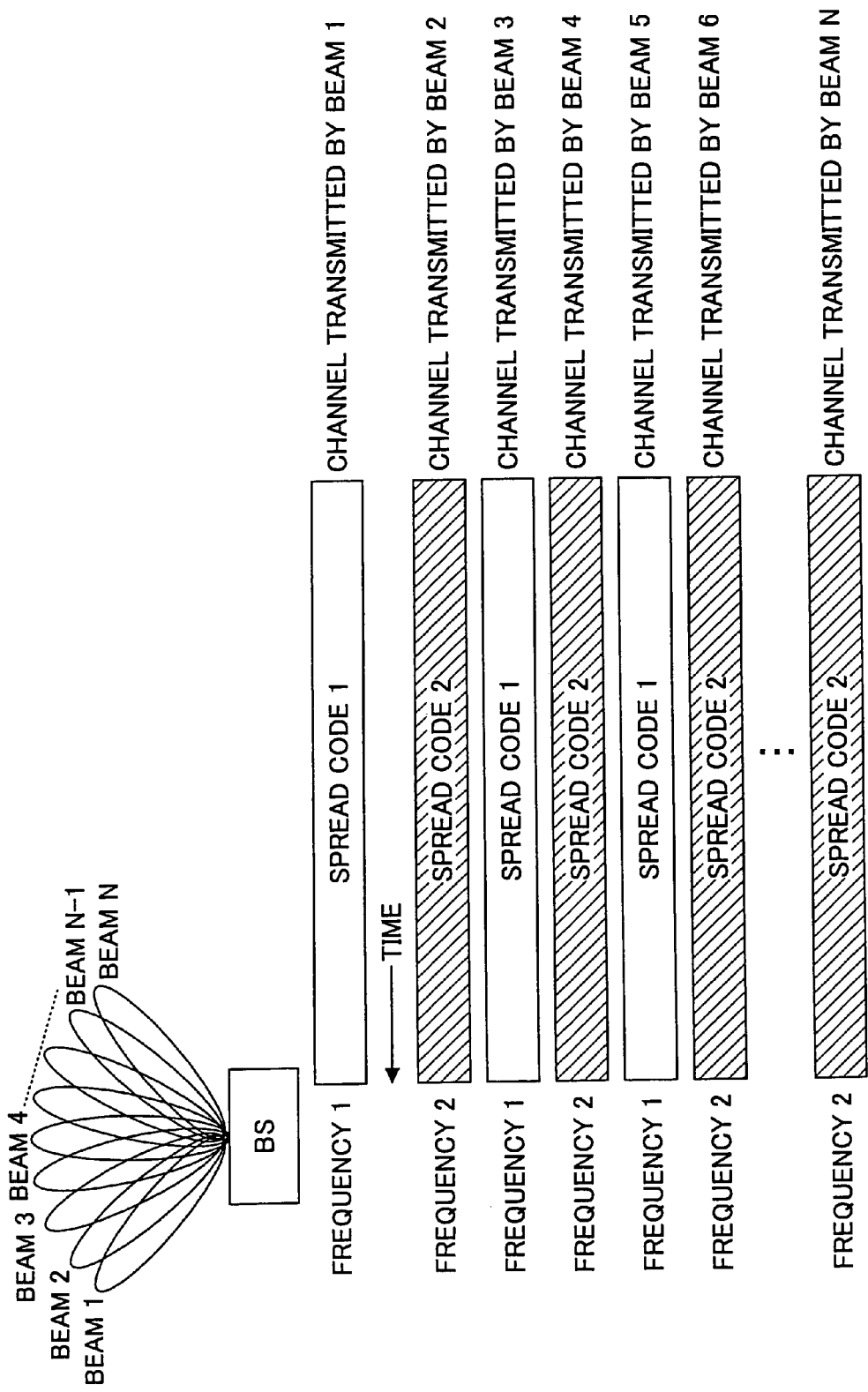
FIG. 20 shows yet another example of multiplexing directional beams.

FIG. 18, FIG. 19 and FIG. 20 illustrate examples in which the beams are distinguished from each other, using different frequencies and different spread codes. Each of such beams is produced by the second transmission signal generator 204 (FIG. 2). In FIG. 18, a pair of beams with different spectra spread using different spread codes (spread code 1 and spread code 2) are generated, but are to be transmitted at the same frequency (frequency 1). Another pair of beam patterns with different spectra spread by different spread codes (spread code 1 and spread code 2) are generated, but are to be transmitted in another frequency (frequency 2). These two pairs of beams are used repeatedly. Consequently, the beam defined by the same spread code and the same frequency appears every fourth beam. In FIG. 19, a pair of beam patterns to be transmitted using different frequencies (frequency 1 and frequency 2), but spread by the same spread code (spread code 1), are generated. Another pair of beam patterns to be transmitted using different frequencies, but spread by another spread code (spread code 2), are also generated. These two pairs of beams are used repeatedly, and the beam defined by the same spread code and the same frequency appears every fourth beam. In FIG. 20, a pair of beams to be transmitted using different frequencies and different spread codes is generated, and these two beams are used alternately. Every other beam is transmitted at the same frequency and with the same spread spectrum.

Figure 21:
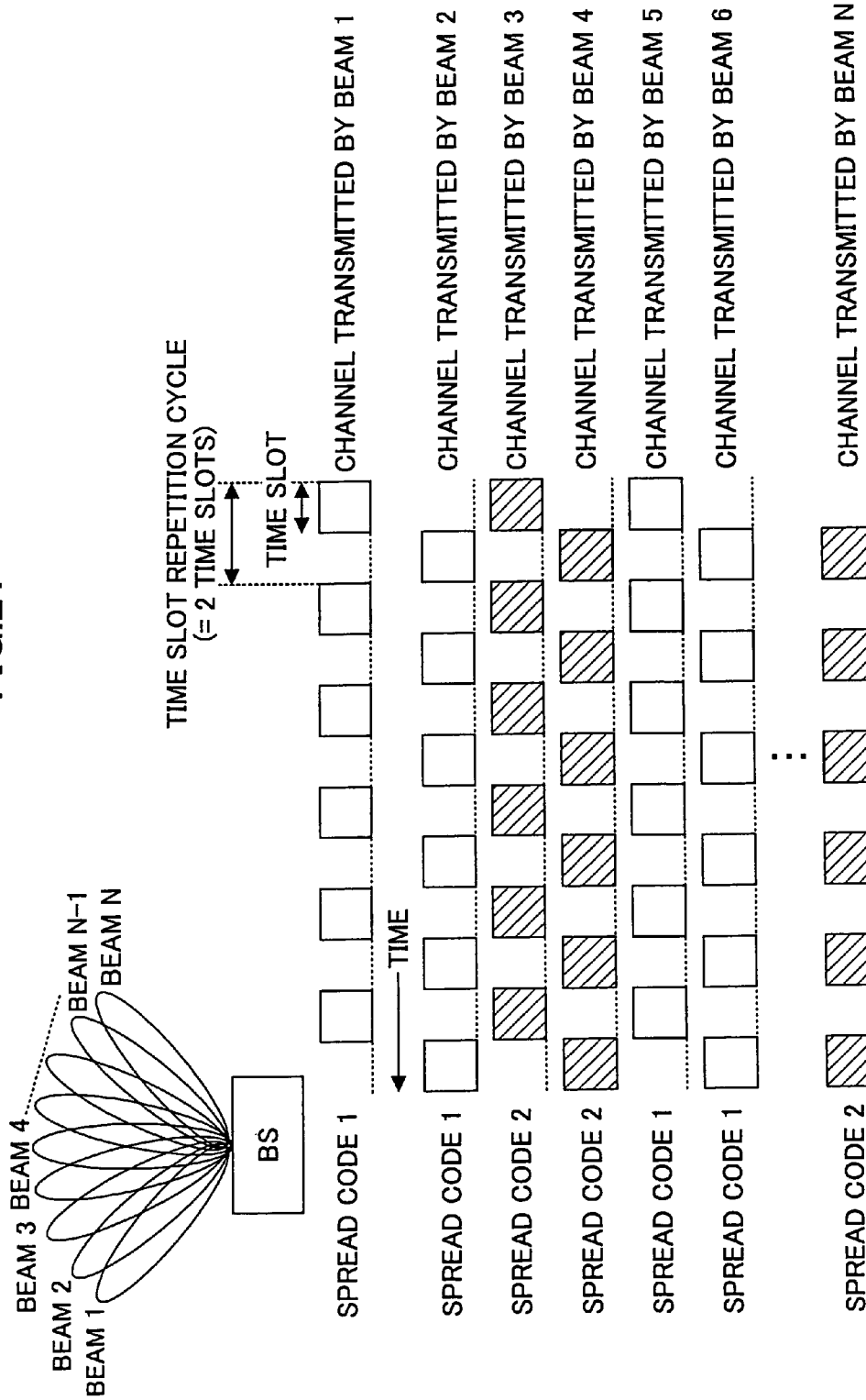
FIG. 21 shows yet another example of multiplexing directional beams.
Figure 22:
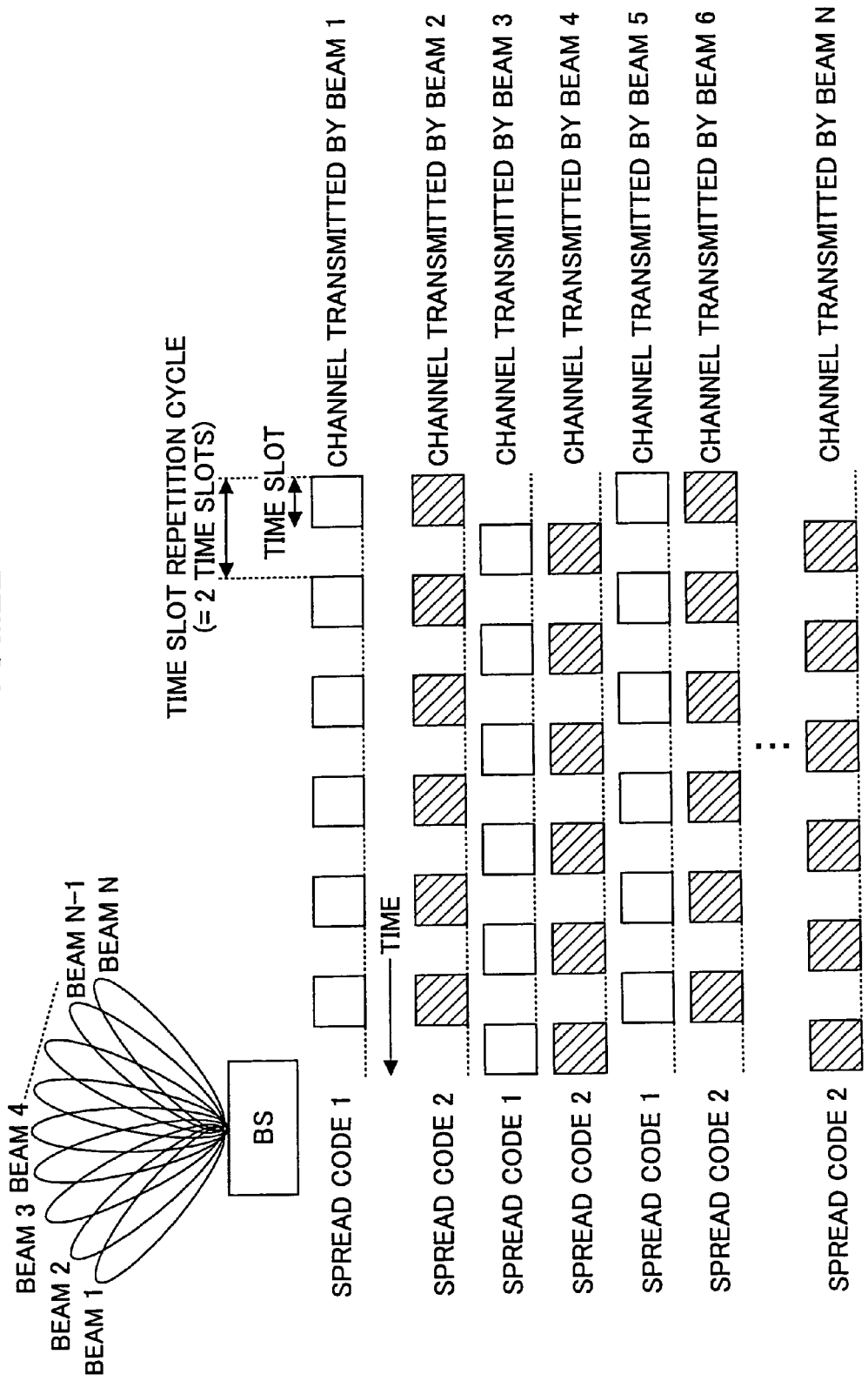
FIG. 22 shows yet another example of multiplexing directional beams.
Figure 23:
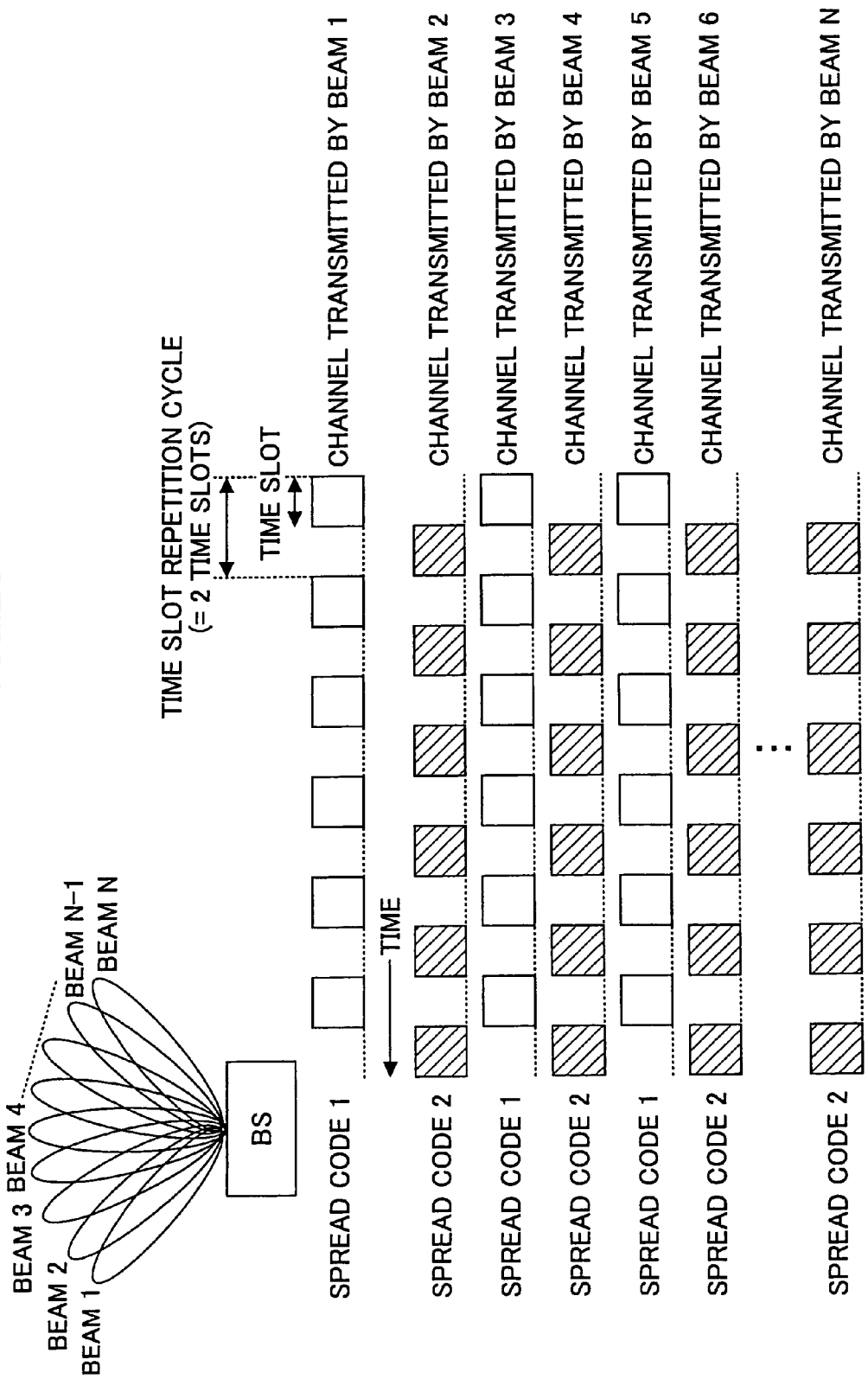
FIG. 23 shows yet another example of multiplexing directional beams.

FIG. 21, FIG. 22, and FIG. 23 illustrate examples in which the beams are distinguished from each other, using different spread codes and different time slots. Each of such beams is produced by the second transmission signal generator 204 (FIG. 2). In FIG. 21, a pair of beams to be transmitted in different time slots, but spread with a same spread code (spread code 1), are generated. Another pair of beam patterns to be transmitted in different time slots, but spread with another spread code (spread code 2), are also generated. These two pairs of beams are used repeatedly. Consequently, the beam defined by the same spread code and the same time slot appears every fourth beam. In FIG. 22, a pair of beams with different spectra spread by different spread codes (spread code 1 and spread code 2) are generated, but are to be transmitted in the same time slot. Another pair of beams with different spectra spread by different spread codes are generated, but are to be transmitted in another time slot. These two pairs of beams are used repeatedly. The beam pattern defined by the same time slot and the same spread code appears every fourth beam. In FIG. 23, a pair of beams with different spectra spread by different spread codes, to be transmitted in different time slots, are generated, and the pair is used repeatedly. Every other beam is transmitted in the same time slot and with the same spread spectrum.

Figure 24:
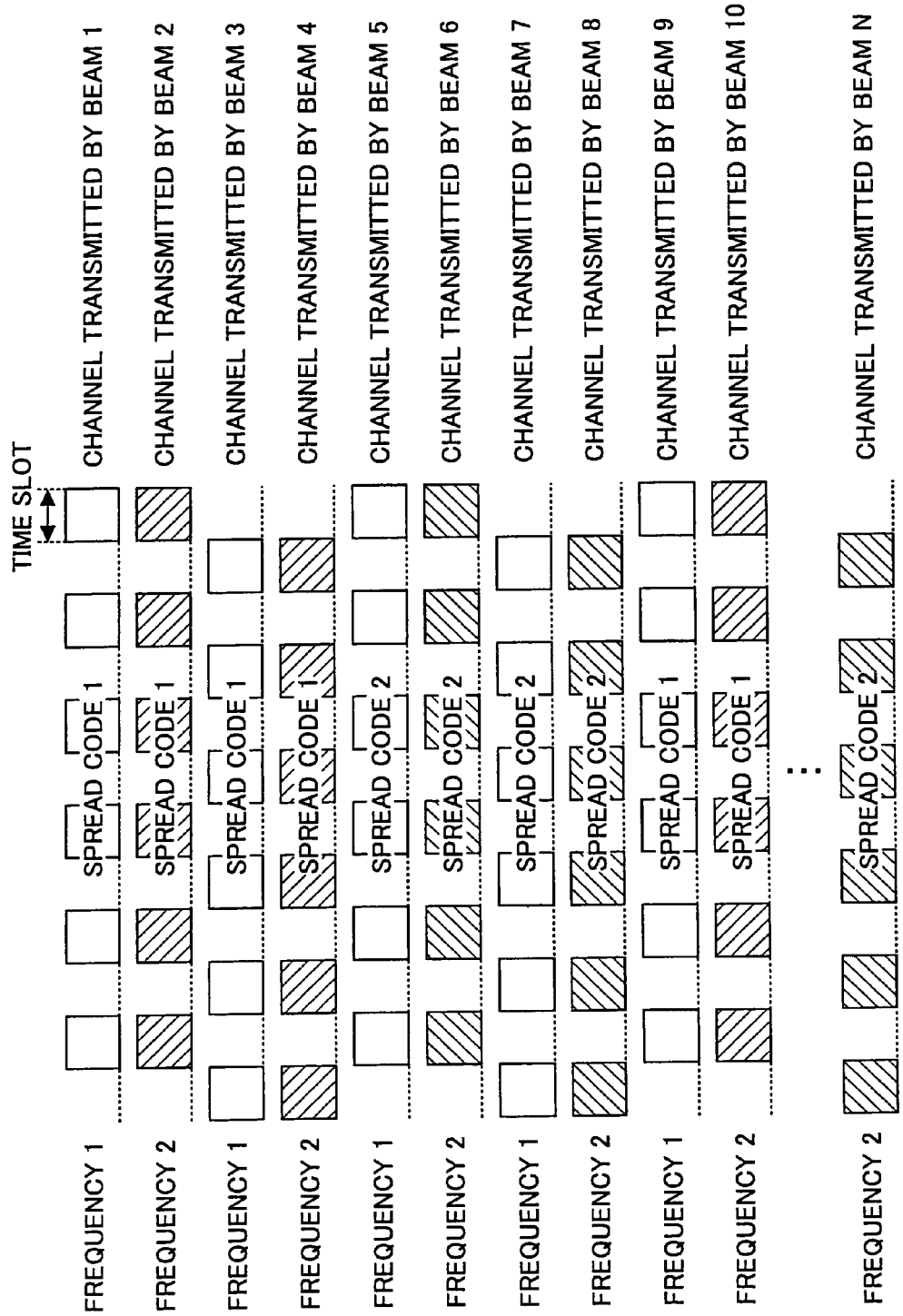
FIG. 24 shows yet another example of multiplexing directional beams.

FIG. 24 illustrates an example in which the beams are distinguished from each other, using different frequencies, different time slots, and different spread codes. Each of the beam patterns is produced by the second transmission signal generator 204 (FIG. 2). Four pairs of beam patterns are prepared such that each pair is to be transmitted using different frequencies (frequency 1 and frequency 2), but with the same spread code and the same time slot, and the time slot and the spread code are varied among the four pairs. The four pairs of beams are used repeatedly. Accordingly, the beam defined by the same frequency, the same time slot, and the same spread code appears every eighth beam.

Next, explanation is made of beam identification when a beam with weak directivity is multiplexed on a beam with strong directivity, as illustrated in FIG. 7D. These beams are distinguished from each other using one of the techniques shown in FIG. 9 through FIG. 24. The beam for omnidirectional sector transmission can be formed by and transmitted from a single antenna element 102 (FIG. 1) using a large-sized power amplifier, as in the conventional method. Alternatively, it may be transmitted from multiple antenna elements 208 (FIG. 2), as in the present embodiment. In the following examples, the beam to be subjected to omnidirectional sector transmission is referred to as "beam 0" for convenience sake. On the other hand, the directional beam multiplexed on the omnidirectional beam is transmitted from multiple antenna elements 208 after the adjustment of the weighting factors at the weighting adjustors 216.

Figure 25:
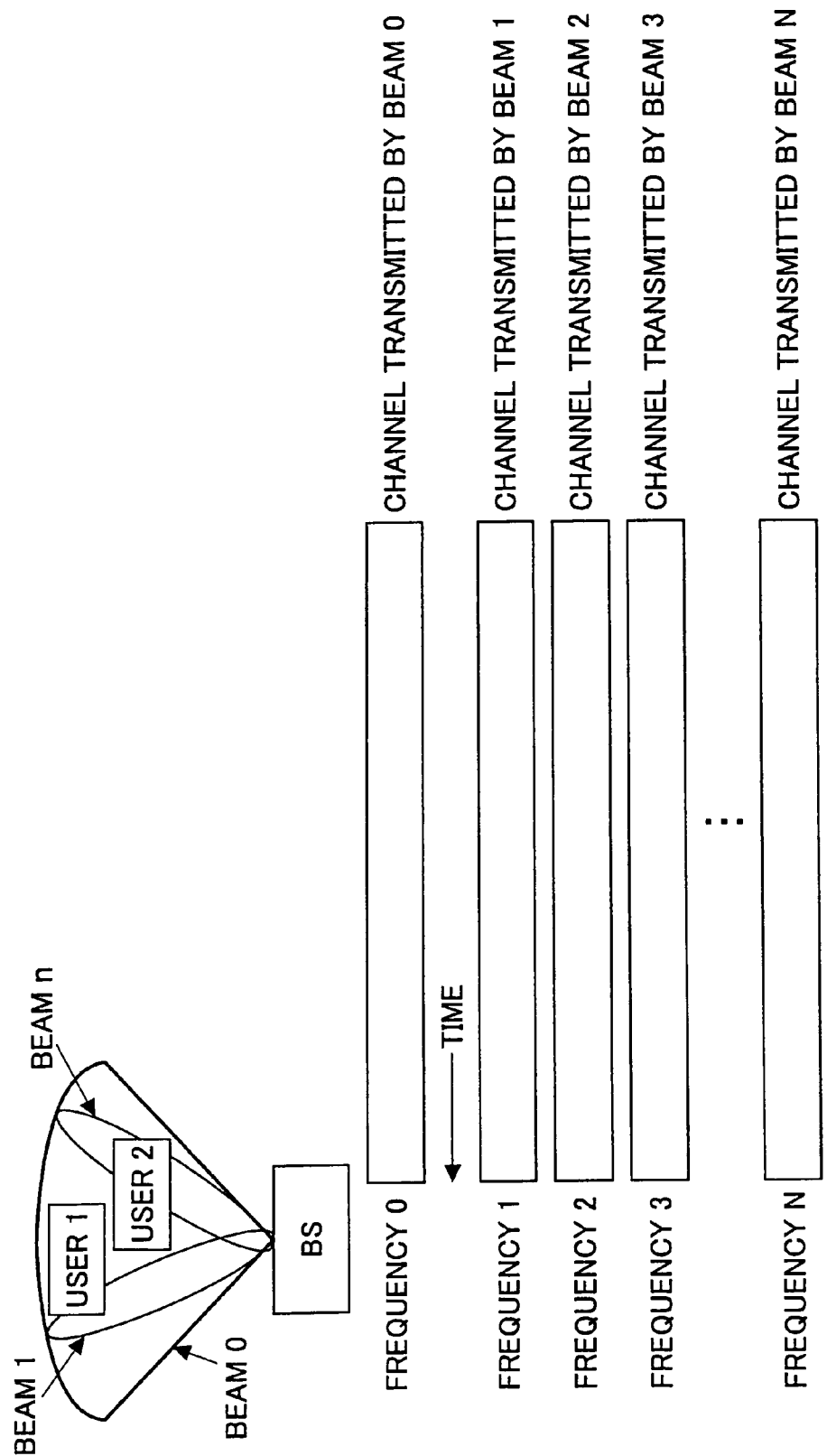
FIG. 25 shows yet another example of multiplexing directional beams.
Figure 26:
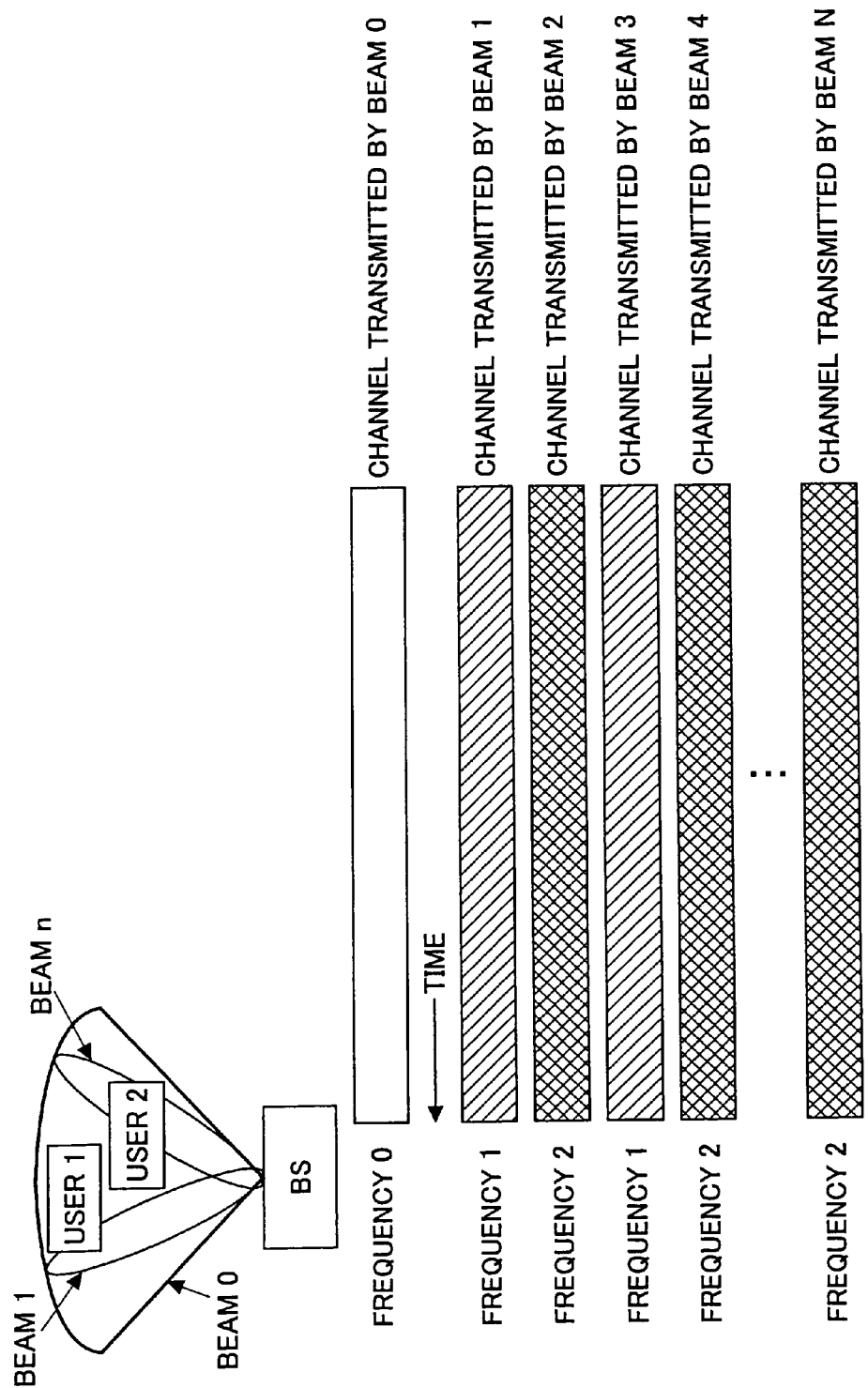
FIG. 26 shows yet another example of multiplexing directional beams.

FIG. 25 and FIG. 26 illustrate an example in which the beams are distinguished from each other using different frequencies. In FIG. 25, all the frequencies assigned to N beams are different from that assigned to beam 0. In FIG. 26, two frequencies different from that of beam 0 are assigned alternately. This arrangement improves the efficiency of using resources (frequencies).

Figure 27:
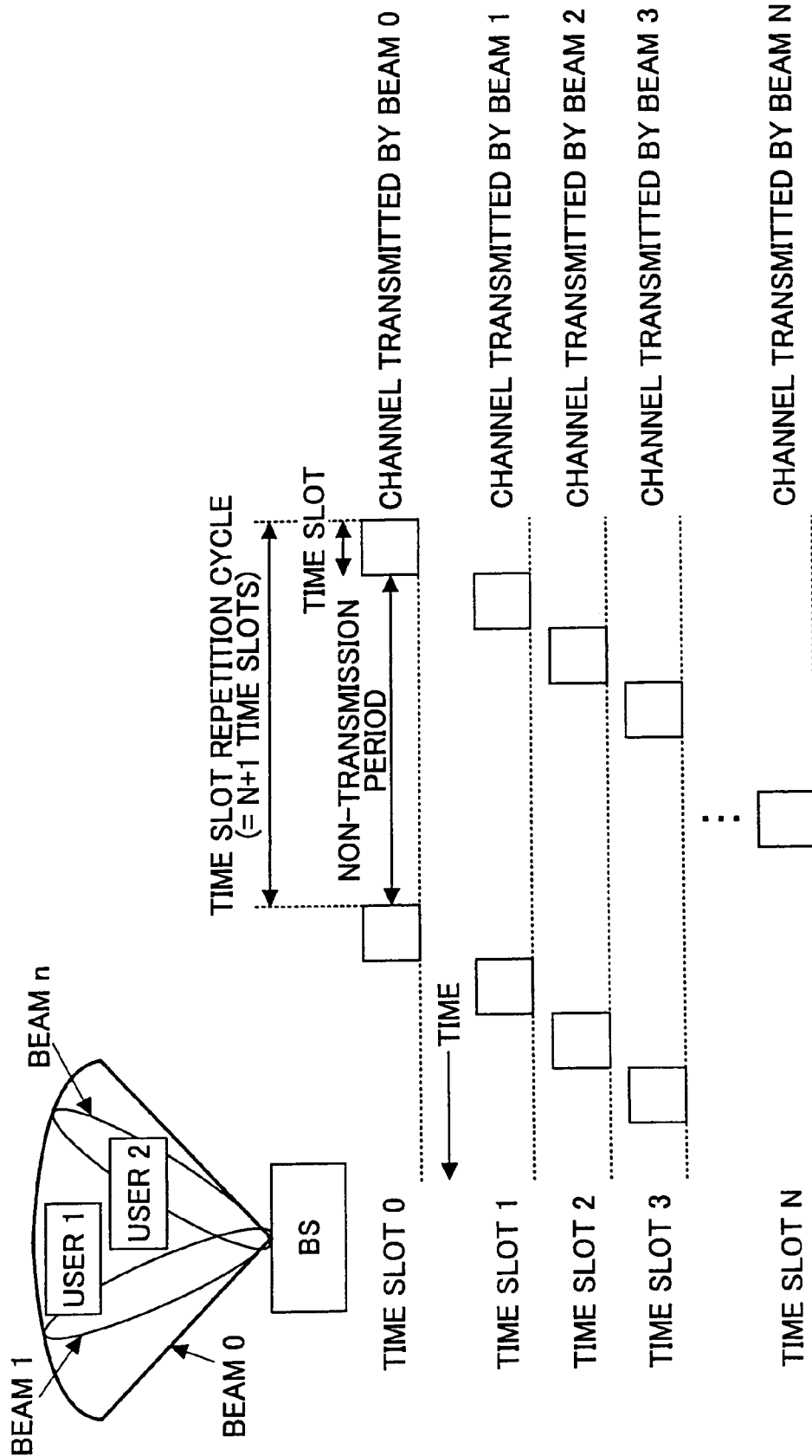
FIG. 27 shows yet another example of multiplexing directional beams.
Figure 28:
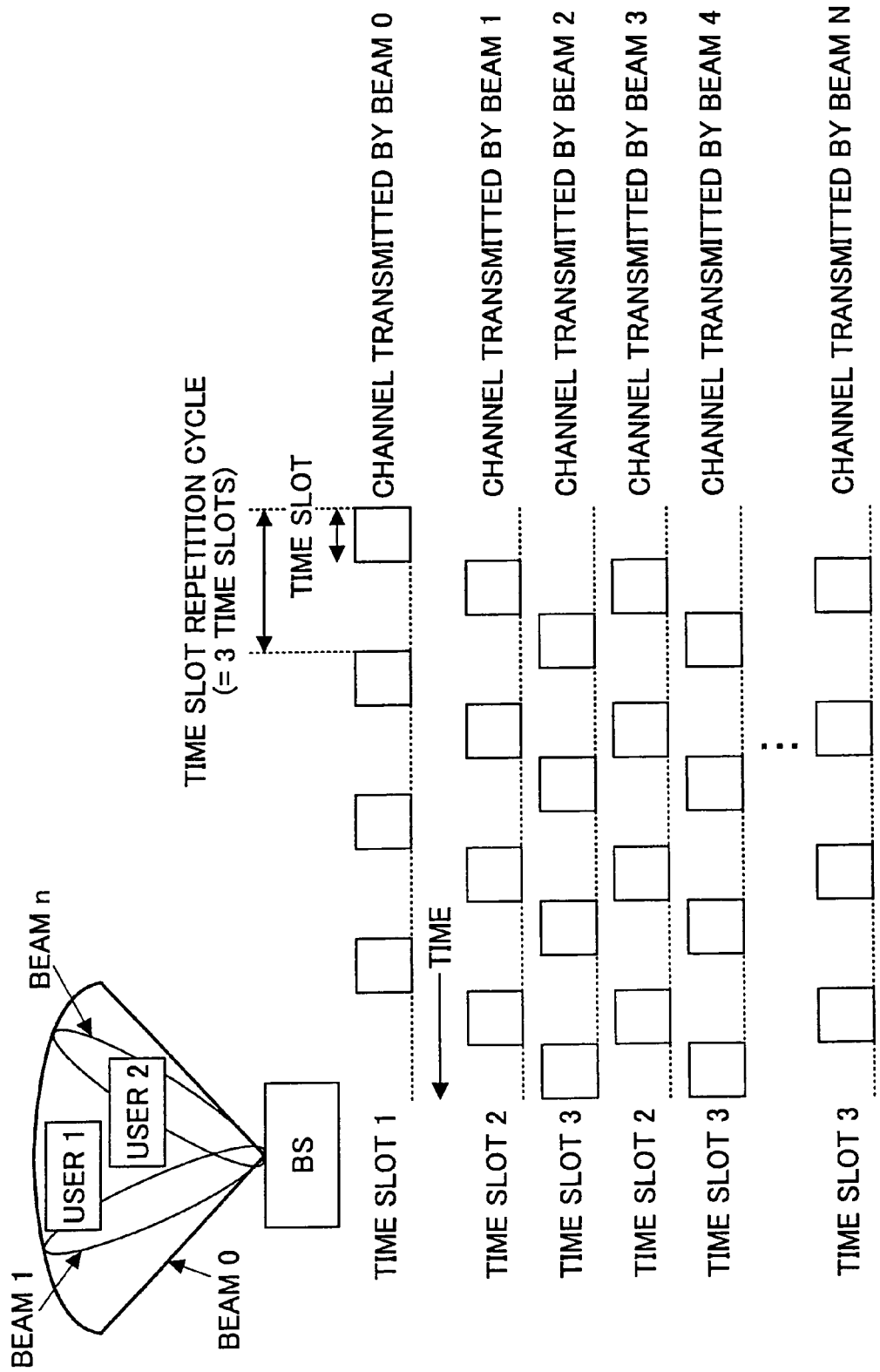
FIG. 28 shows yet another example of multiplexing directional beams.

FIG. 27 and FIG. 28 illustrate an example in which the directional beams are distinguished from each other and from beam 0, using different time slots. In FIG. 27, beam 1 through beam N are transmitted in time slots 1 through N, respectively, which are all different from the time slot assigned to beam 0. In FIG. 28, two time slots, which are different from the time slot assigned to beam 0, are prepared and used alternately, making use of the distinctive directivities of the beam patterns. Every other beam is transmitted in the same time slot. This arrangement improves the throughput (or the transmission rate).

Figure 29:
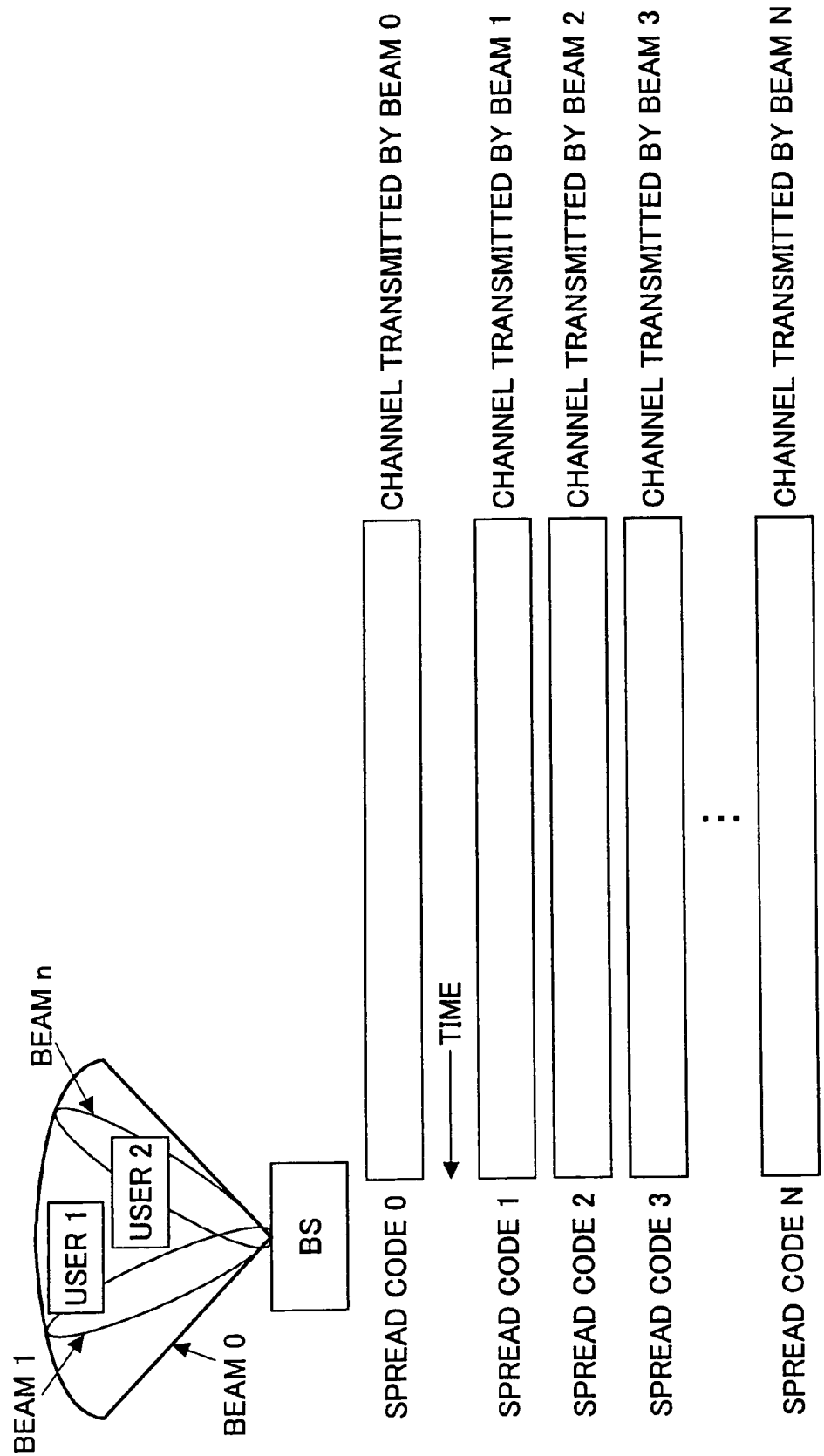
FIG. 29 shows yet another example of multiplexing directional beams.
Figure 30:
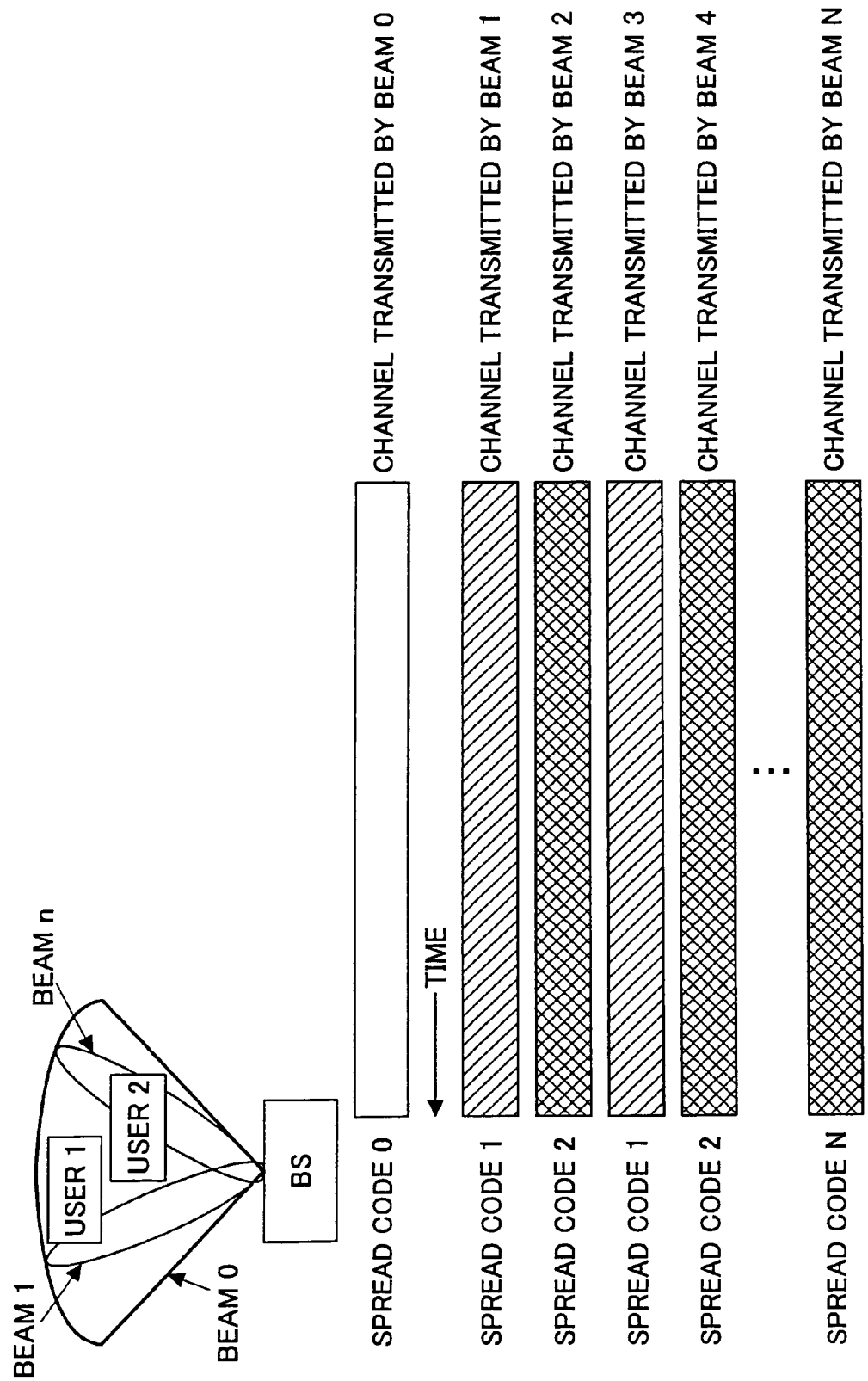
FIG. 30 shows yet another example of multiplexing directional beams.

FIG. 29 and FIG. 30 illustrate an example in which the directional beams are distinguished from each other and from beam 0, using different spread codes. In FIG. 29, the spectra of beams 1 through N are spread using spread codes 1 through N, which are all different from each other and different from the code assigned to beam 0. In FIG. 30, a pair of spread codes, which are different from the code assigned to beam 0, are prepared and used alternately. This arrangement improves the efficiency of using the resources (spread codes).

Figure 31:
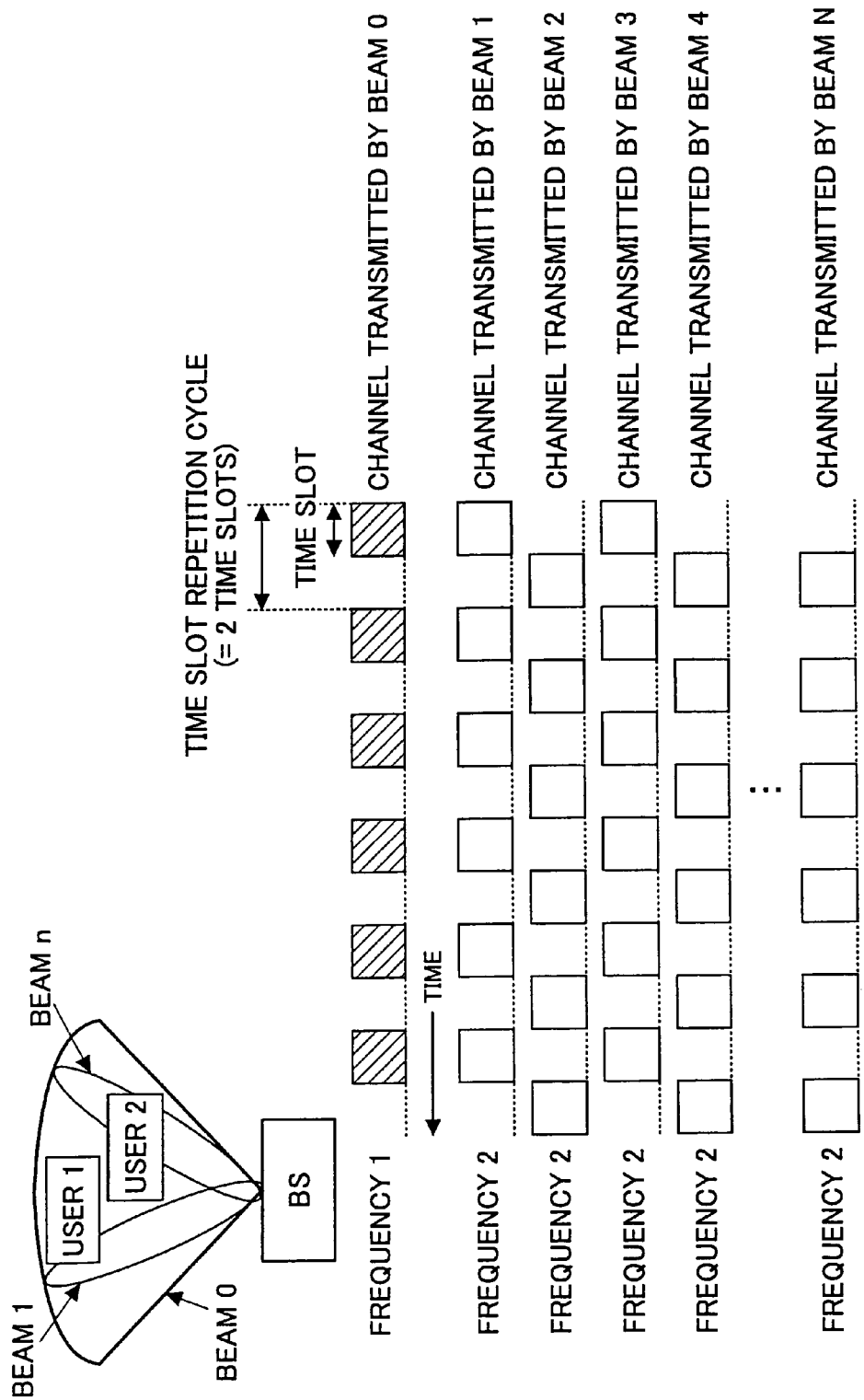
FIG. 31 shows yet another example of multiplexing directional beams.
Figure 32:
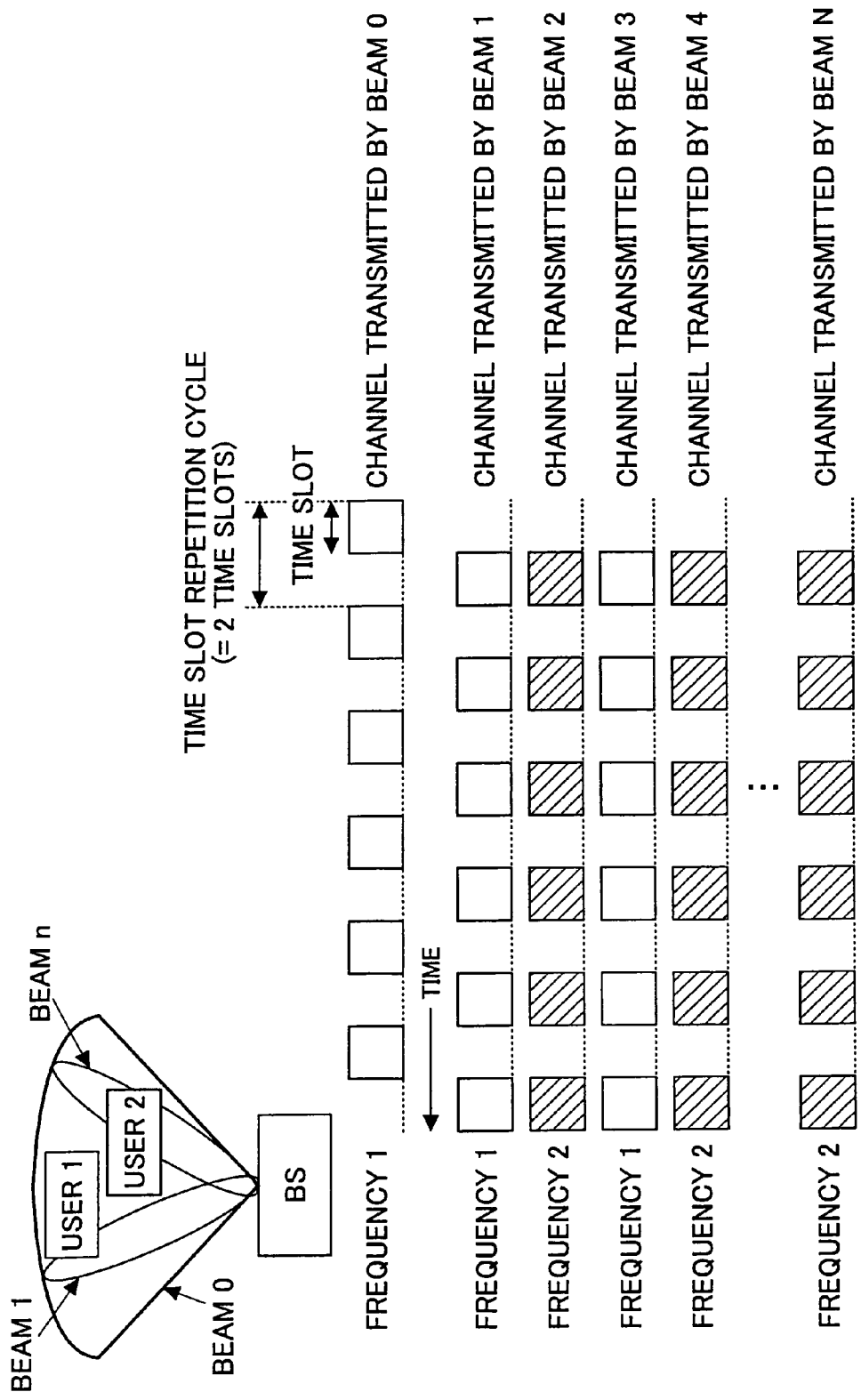
FIG. 32 shows yet another example of multiplexing directional beams.

FIG. 31 through FIG. 38 illustrate examples in which directional beams are distinguished from each other and from beam 0, using different frequencies and different time slots. In FIG. 31, beams 1 through N are transmitted in a second frequency, which is different from the first frequency assigned to beam 0, and in different time slots. To be more precise, a pair of time slots are prepared and used alternately to transmit beams 1 through N. Every other beam is transmitted at the same frequency and in the same time slot. In FIG. 32, beams 1 through N are transmitted in a second time slot, which is different from the first time slot assigned to beam 0. A pair of frequencies are prepared and assigned to beams 1 through N alternately. Accordingly, every other beam is transmitted in the same time slot at the same frequency.

Figure 33:
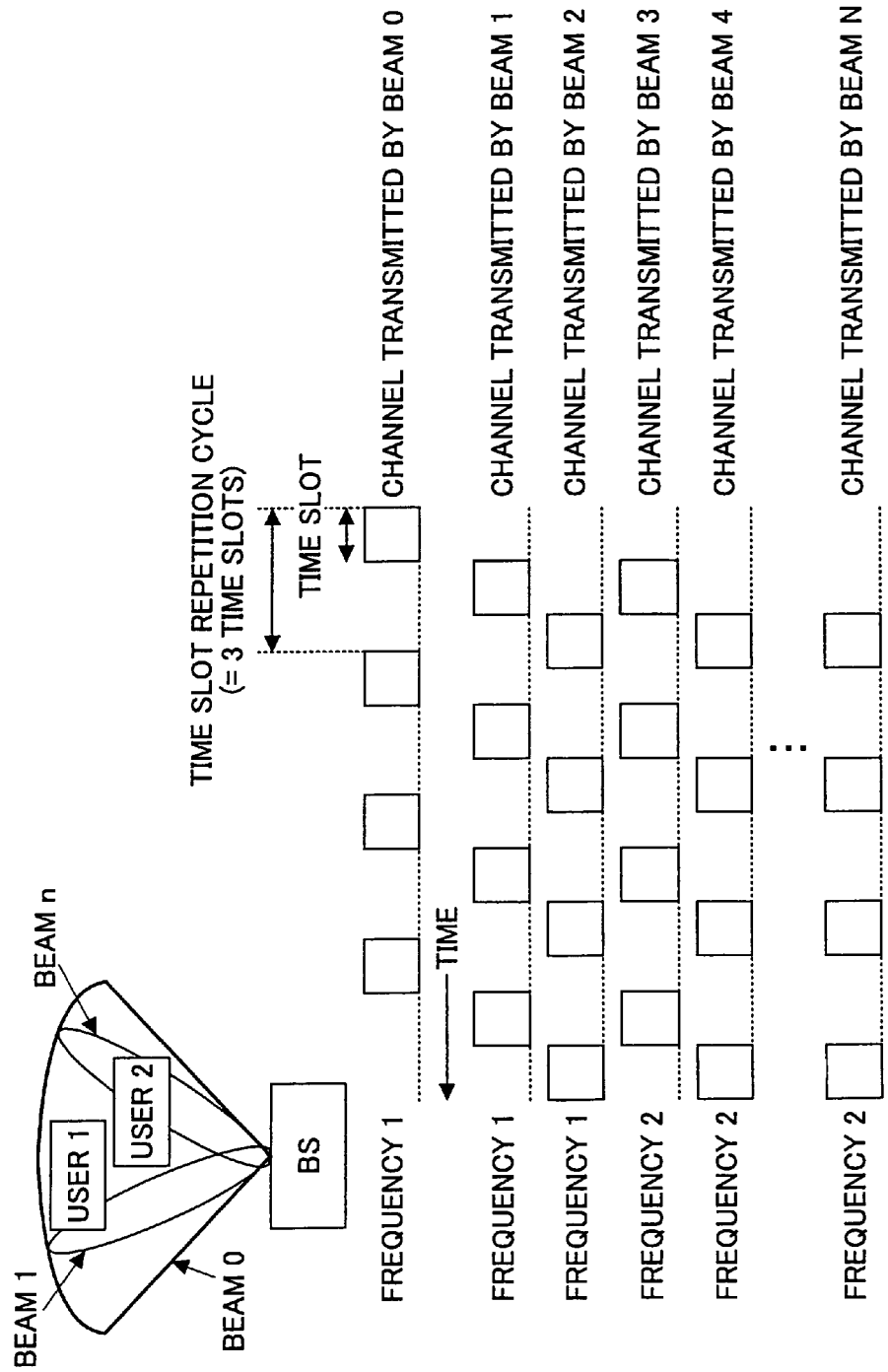
FIG. 33 shows yet another example of multiplexing directional beams.
Figure 34:
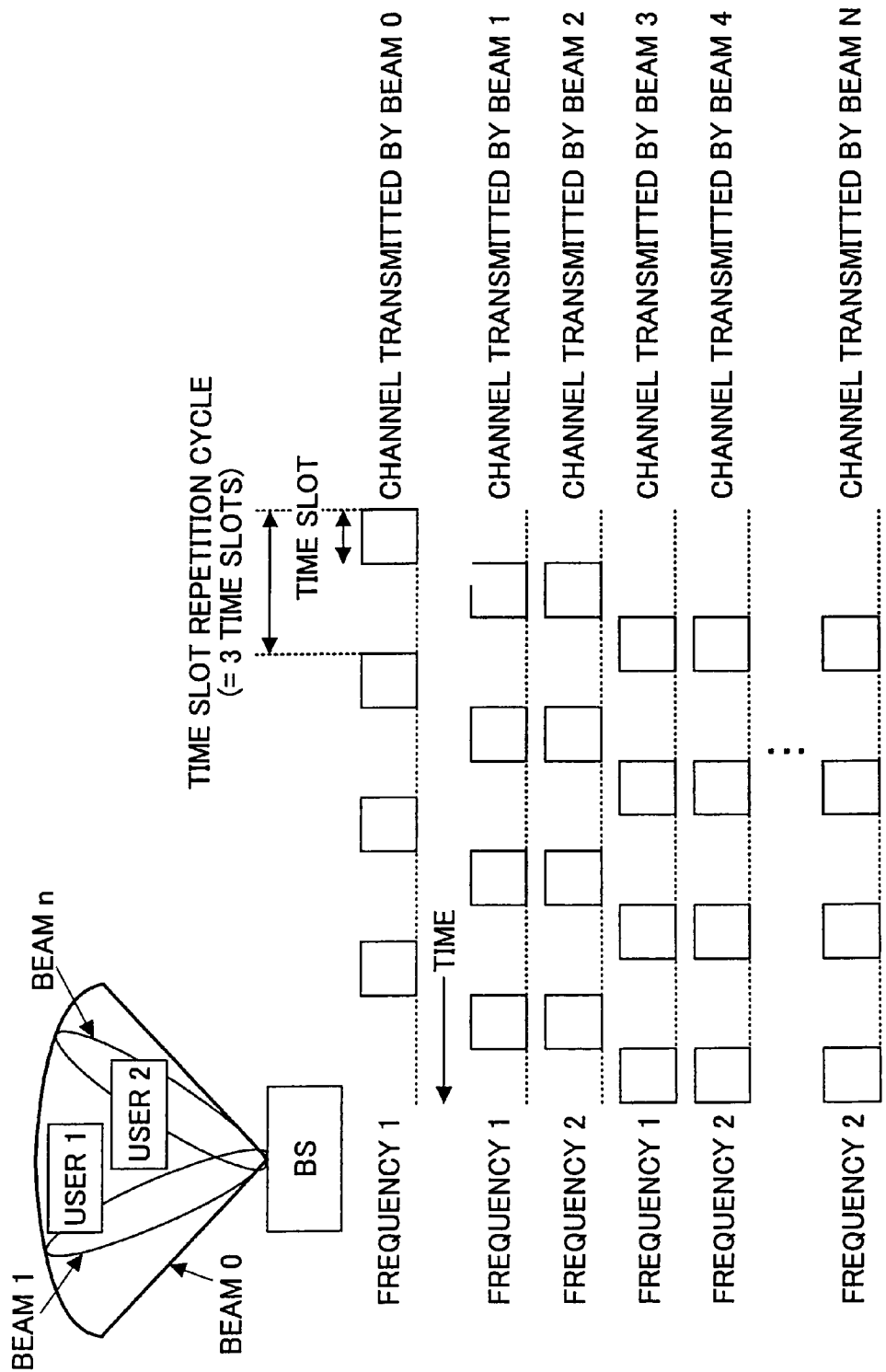
FIG. 34 shows yet another example of multiplexing directional beams.
Figure 35:
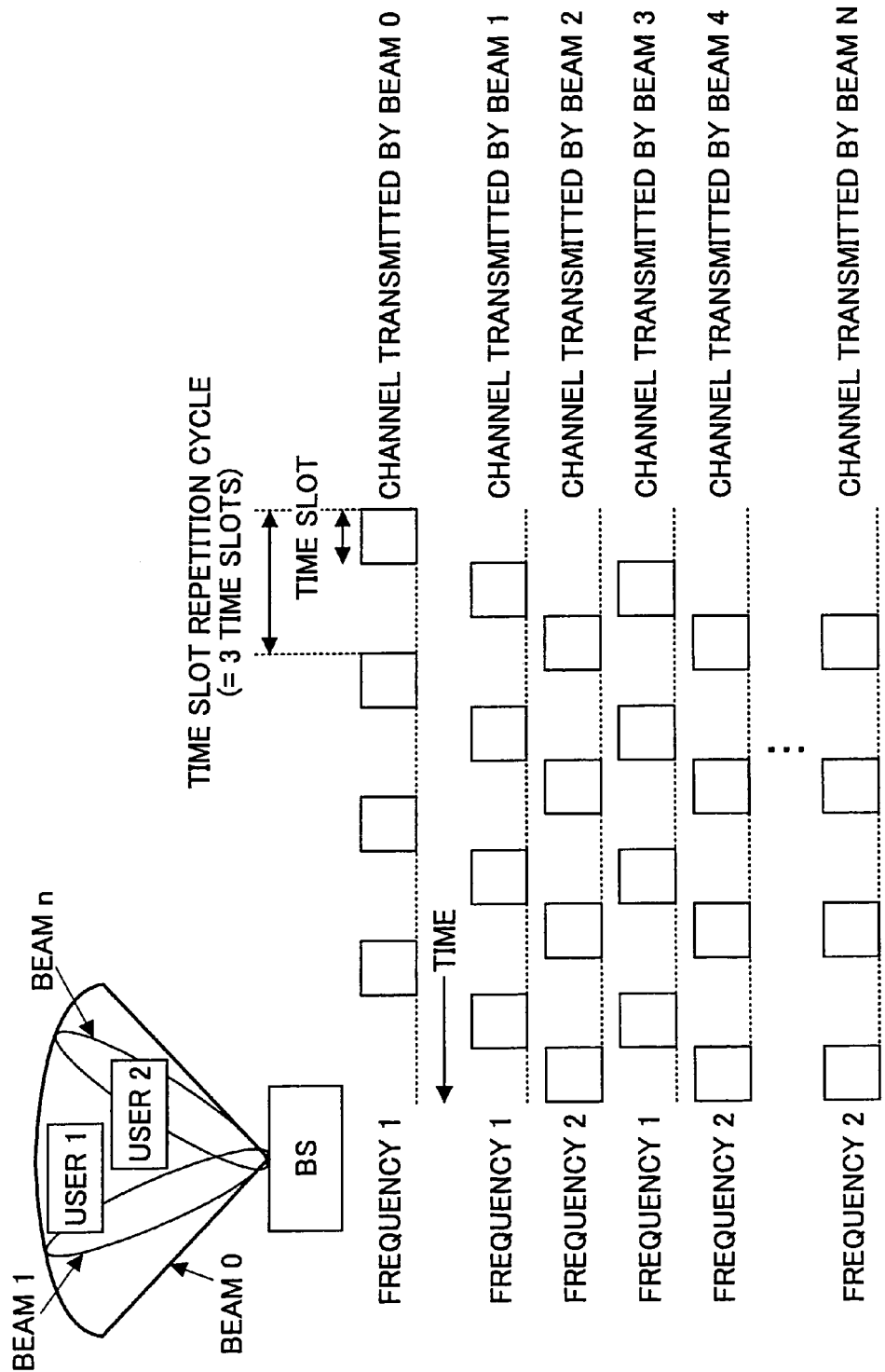
FIG. 35 shows yet another example of multiplexing directional beams.

In FIG. 33, two different time slots, each being different from the time slot assigned to beam 0, are assigned alternately to beams 1 through N. In addition, two different frequencies are used such that a pair of beams provided with different time slots are transmitted at frequency 1, and that another pair of beams provided with different time slots are transmitted at frequency 2. In other words, two pairs of beams transmitted at different frequencies, the beams of each pair being transmitted in different time slots, are used repeatedly. Consequently, every fourth beam is transmitted in the time slot at the same frequency. In FIG. 34, two different time slots, each being different from the time slot assigned to beam 0, are used. A first time slot is assigned to a pair of beams, which beams are transmitted at two different frequencies 1 and 2. A second time slot is assigned to another pair of beams, which are also transmitted at two different frequencies 1 and 2. Two pairs of beams transmitted in different time slots, the beams of each pair being transmitted at different frequencies, are used repeatedly. Consequently, every fourth beam is transmitted in the same time slot at the same frequency. In FIG. 35, two different time slots, each being different from the time slot assigned to beam 0, are assigned alternately to beams 1 through N. In addition, two different frequencies are assigned alternately to beams 1 through N. The beams of a pair to be transmitted in different time slots at different frequencies are used repeatedly. Consequently, every other beam is transmitted in the same time slot and at the same frequency.

Figure 36:
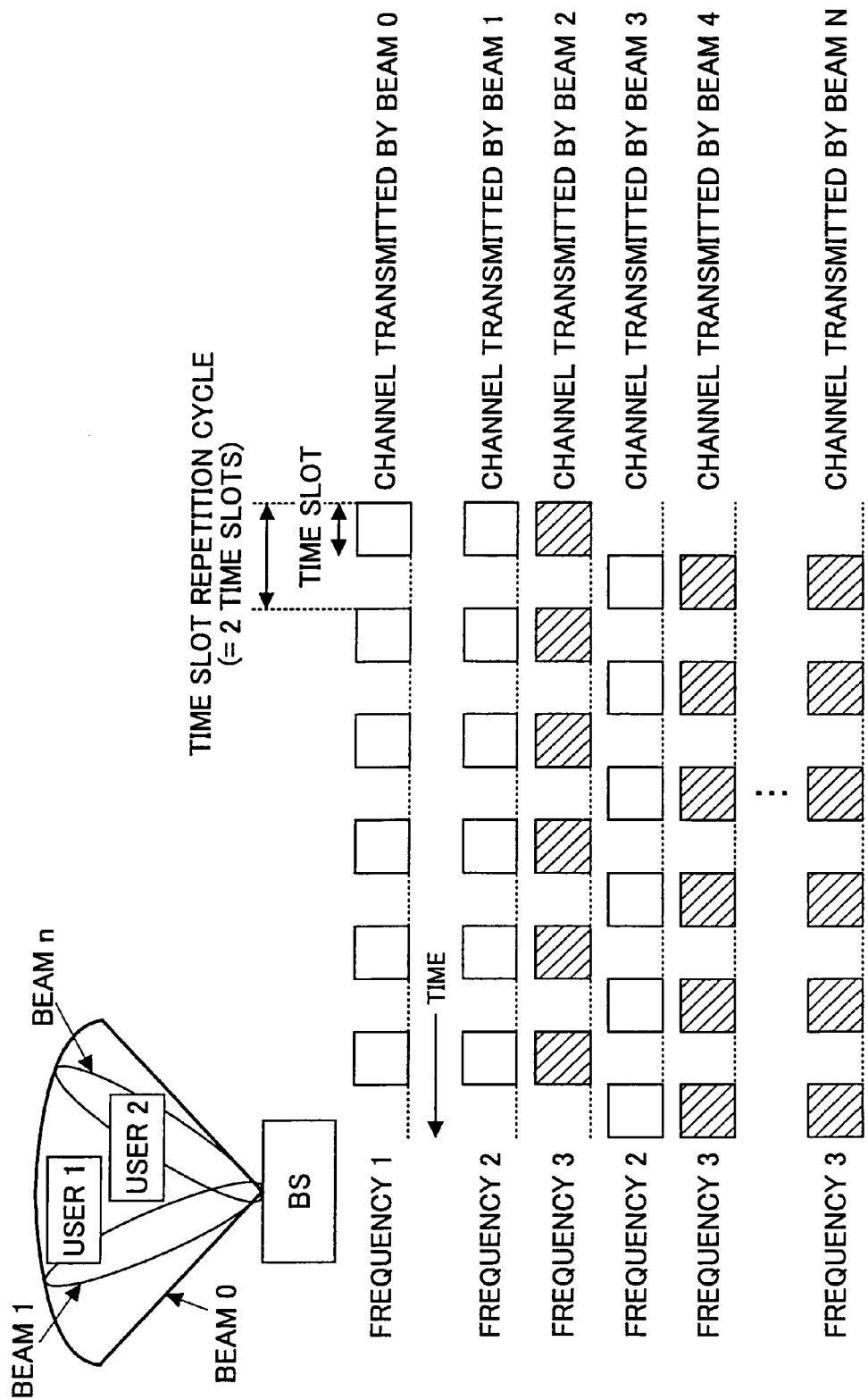
FIG. 36 shows yet another example of multiplexing directional beams.
Figure 37:
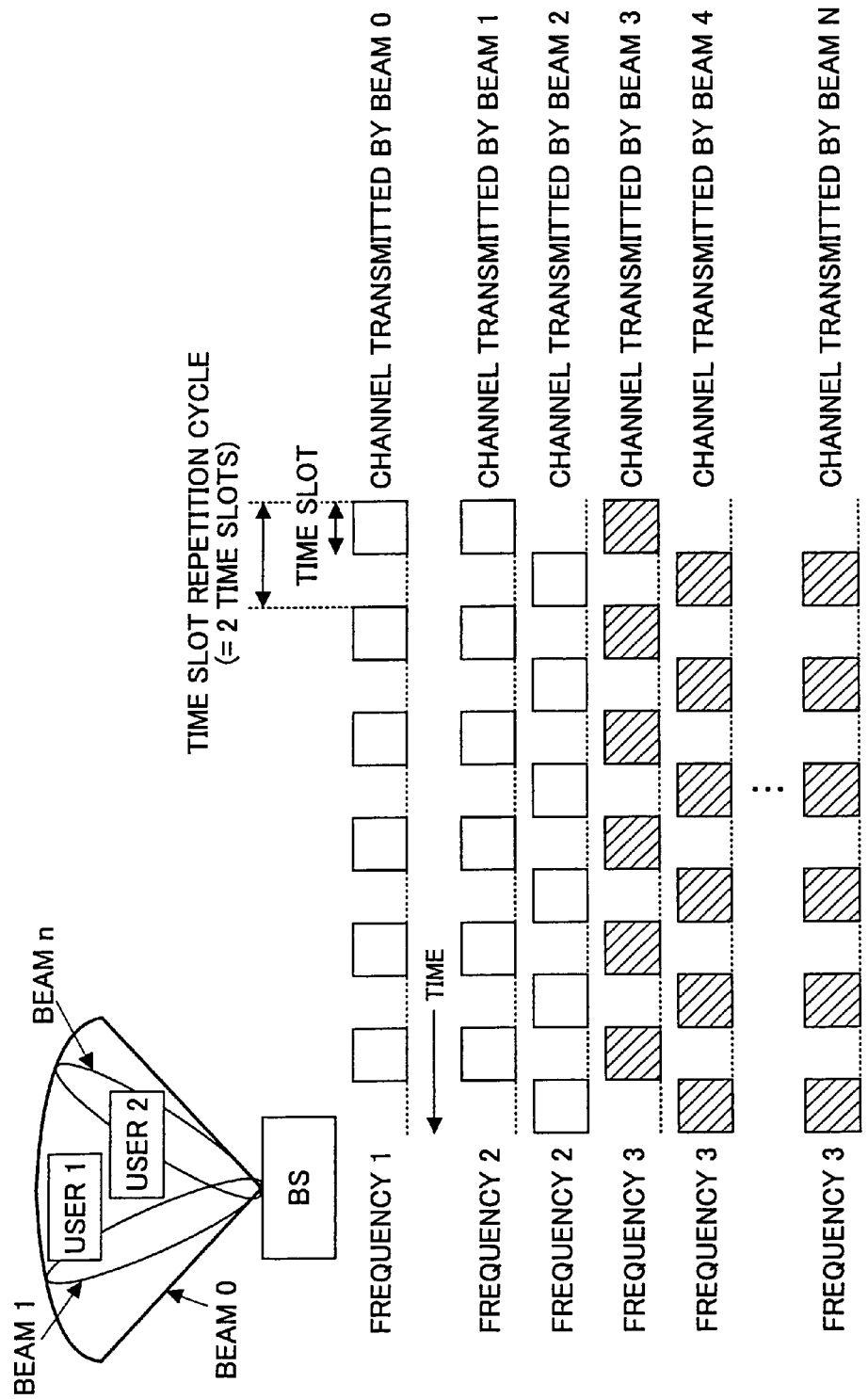
FIG. 37 shows yet another example of multiplexing directional beams.
Figure 38:
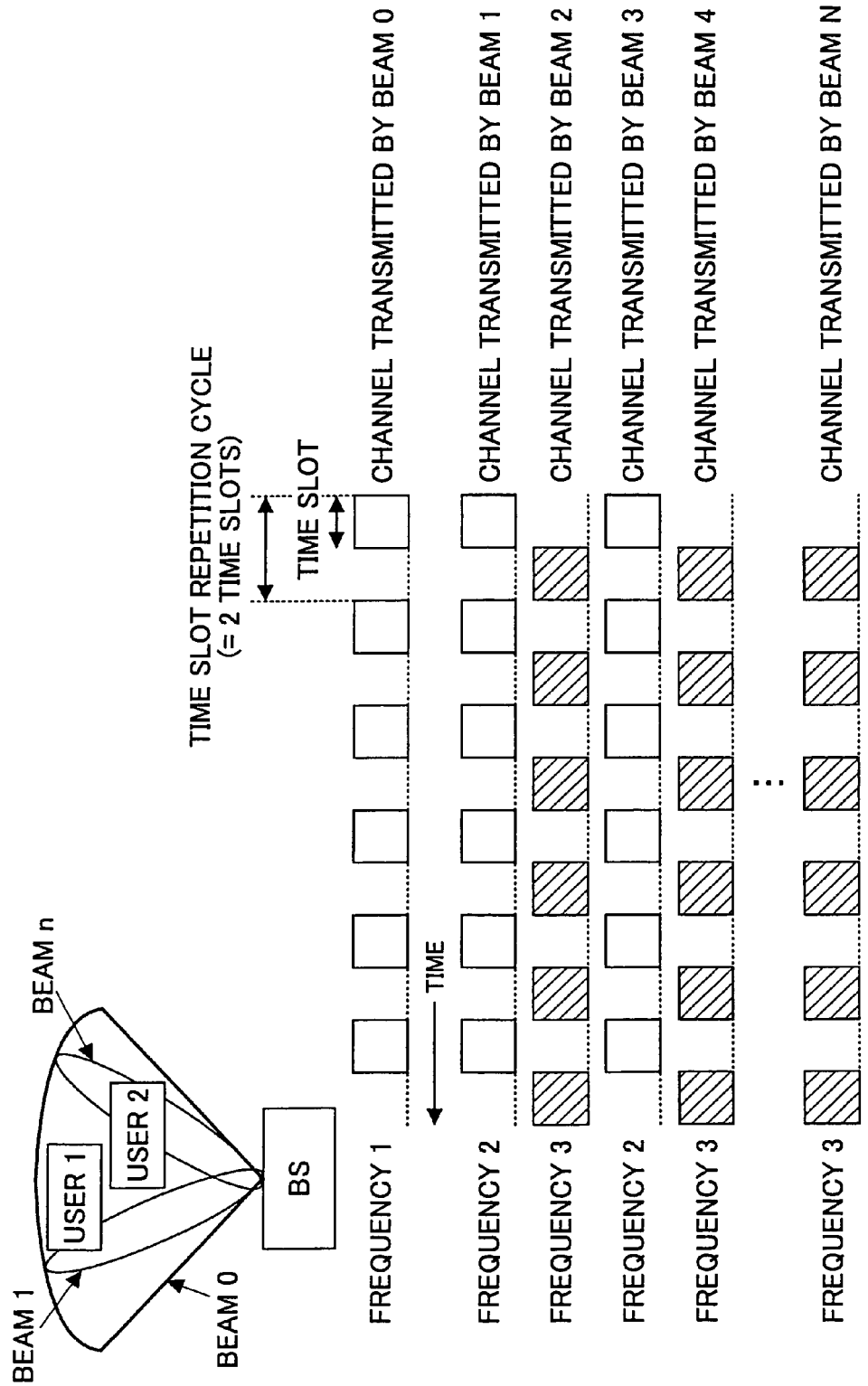
FIG. 38 shows yet another example of multiplexing directional beams.

In FIG. 36, two different frequencies (frequency 2 and frequency 3), each being different from the frequency assigned to beam 0, are assigned alternately to beams 1 through N. In addition, two different time slots are used such that a pair of beams provided with different frequencies are transmitted in one of the time slots, and another pair of beams provided with different frequencies are transmitted in the other time slot. In other words, two pairs of beams transmitted in different time slots, the bema of each pair being transmitted at different frequencies, are used repeatedly. Consequently, every fourth beam is transmitted in the same time slot at the same frequency. In FIG. 37, two different frequencies, each being different from the frequency assigned to beam 0, are assigned to beams 1 through N. In addition, two different time slots are assigned alternately to beams 1 through N, such that a pair of beams provided with different time slots are transmitted at frequency 2, and another pair of beams are transmitted at frequency 3. In other words, two pairs of beams transmitted at different frequencies, the beams of each pair being transmitted in different time slots, are used repeatedly. Consequently, every fourth beam is transmitted in the same time slot at the same frequency. In FIG. 38, two different frequencies, each being different from the frequency assigned to beam 0, are assigned alternately to beams 1 through N. In addition, two different time slots are assigned alternately to beams 1 through N. A pair of beams, which beams are to be transmitted in different time slots at different frequencies, are used repeatedly. Consequently, every other beam is transmitted in the same time slot and at the same frequency.

Figure 39:
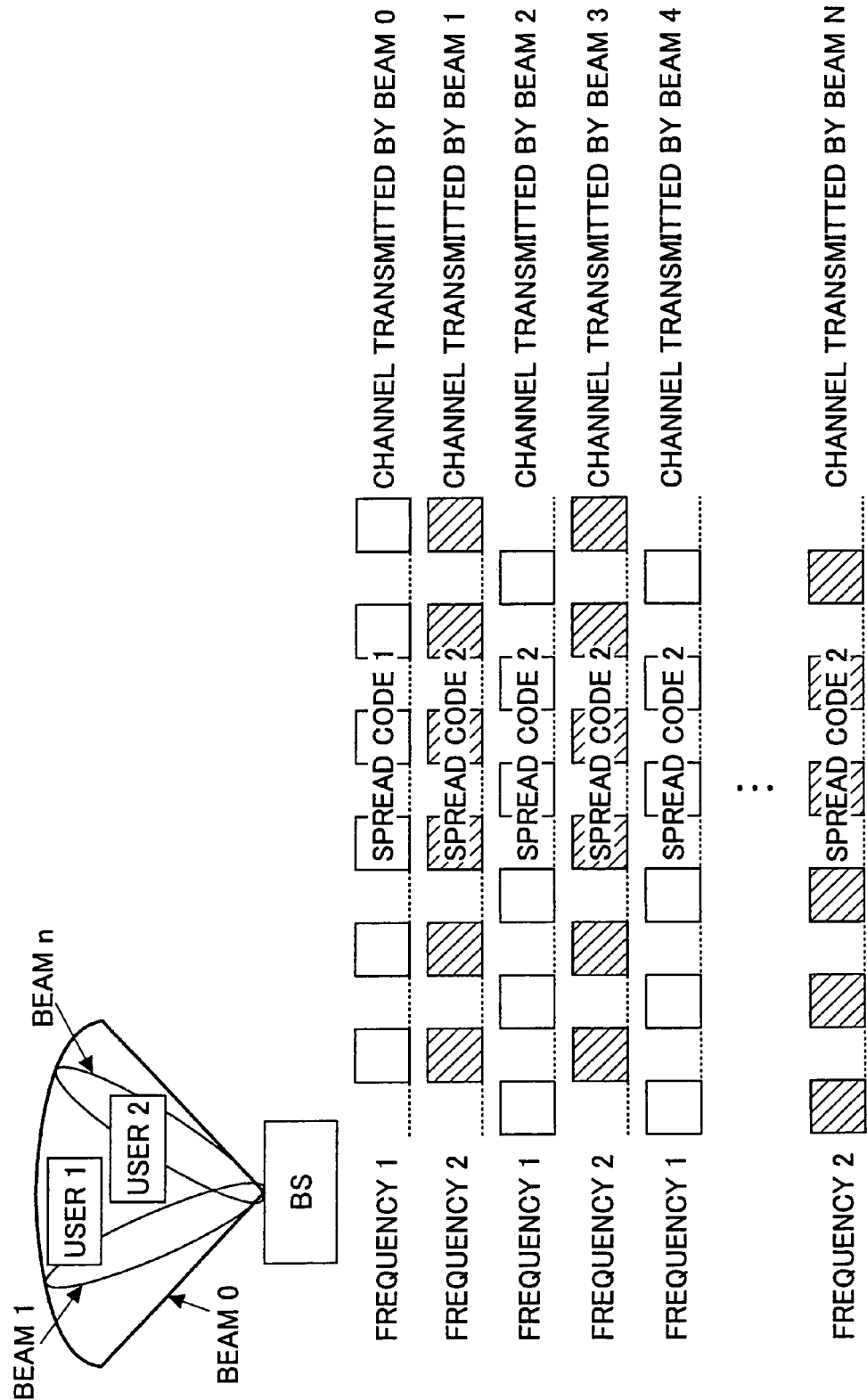
FIG. 39 shows yet another example of multiplexing directional beams.
Figure 40:
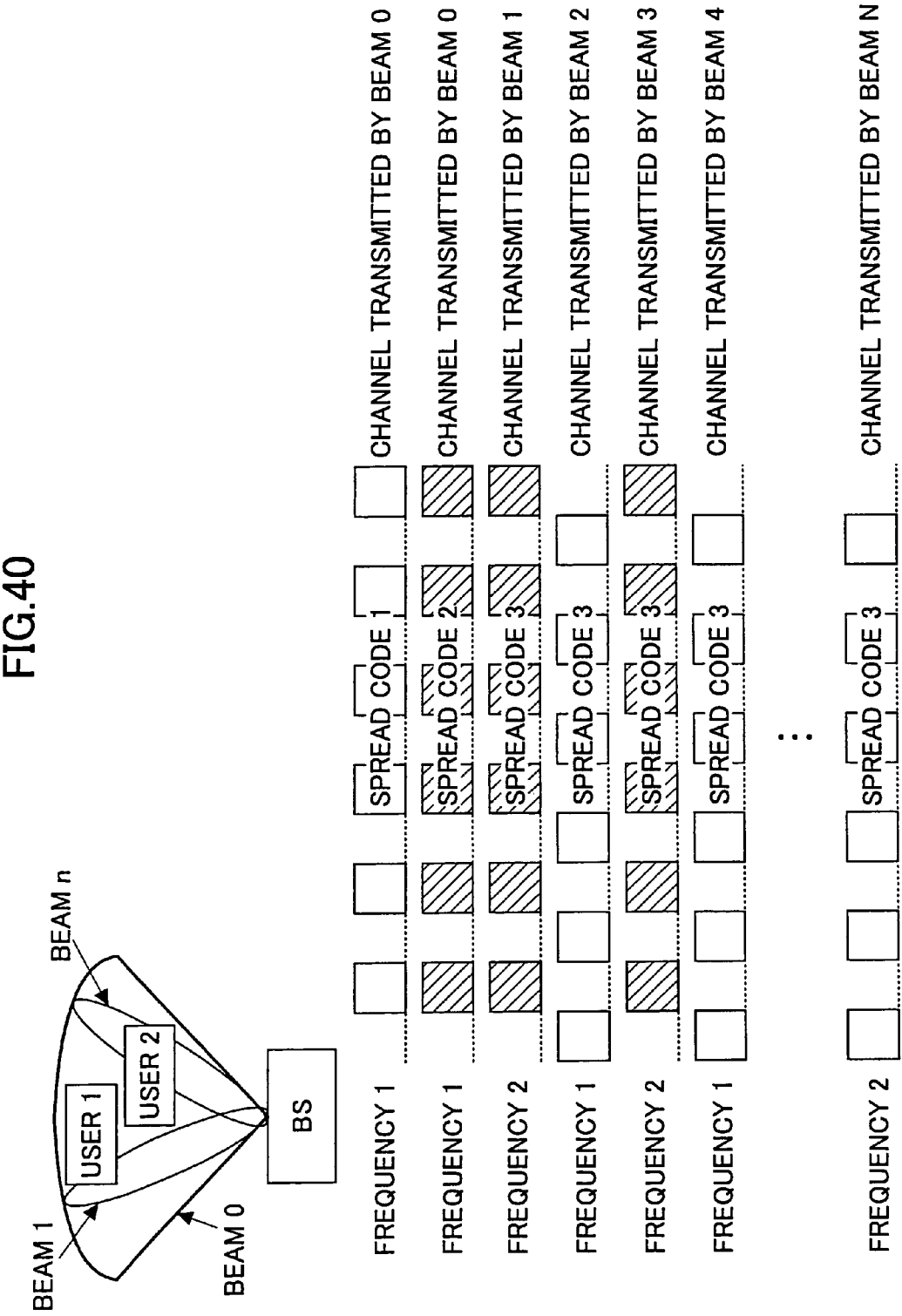
FIG. 40 shows yet another example of multiplexing directional beams.

FIG. 39 and FIG. 40 illustrate examples in which beams are distinguished from each other and from beam 0, using different frequencies, different time slots, and different spread codes. In FIG. 39, the spectra of beams 1 through N are spread by a spread code 2, which is different from spread code 1 used for beam 0. Two different frequencies are assigned alternately to beams 1 through N, and two different time slots are assigned alternately to beams 1 through N. In other words, a pair of beams, which beams are to be transmitted in different time slots at different frequencies, are used repeatedly, and consequently, every other beam is transmitted in the same time slot at the same frequency, using the same spread code. In FIG. 40, beam 0 is used to transmit two common channels using two different spread codes. A third spread code, which is different from the spread codes used for beam 0, is used to spread the spectra of beams 1 through N. Two different frequencies and two different time slots are assigned alternately to beams 1 through N, such that a pair of beams, which beams are to be transmitted in different time slots at different frequencies, are used repeatedly. Consequently, every other beam is transmitted in the same time slot at the same frequency, using the same spread code.

The beams can be identified (or distinguished from each other) using various methods, other than the examples shown in FIG. 9 through FIG. 40. For example, when using several frequencies repeatedly, the same frequency may be assigned to every arbitrary number of beams, other than every other beam or every fourth beams. Such patterns may be changed regularly or irregularly. Which beam pattern is to be employed is determined appropriately, depending on purposes. To reduce the workload on signal processing, it is desired to identify the beams based on one of the factors of frequency, time slot, and spread code. To improve beam identification, it is desired to identify the beams based on a combination of the above-described factors. For application to an orthogonal frequency division multiplex (OFDM) communication system, in which information on the frequency axis greatly affects the demodulation accuracy of signals, it is desired to identify the beams using the factors other than frequency, such as time, spread code, or directivity.

Next, multiplexing of the common channel and a pilot channel making use of omnidirectional sector transmission and directional beam transmission is explained. A pilot channel is a known signal or a reference signal (whose modulation pattern is known at a receiver on the user side) used for demodulation of the common channel. Examples of the pilot channel include a reference signal for sync detection, a reference signal used for channel estimation, and a reference signal used for measurement of SIR (signal to interference ratio). The SIR is used when conducting cell search, adaptive modulation/demodulation, error correction coding, and transmit power control. The common channel includes, for example, CCCH, which is transmitted to users located in a certain area. When transmitting the common channel and the pilot channel, the beams for carrying these channels have to be distinguished from one another, based on the directivities, the frequencies, the time slots, or the spread codes.

Figure 41A:
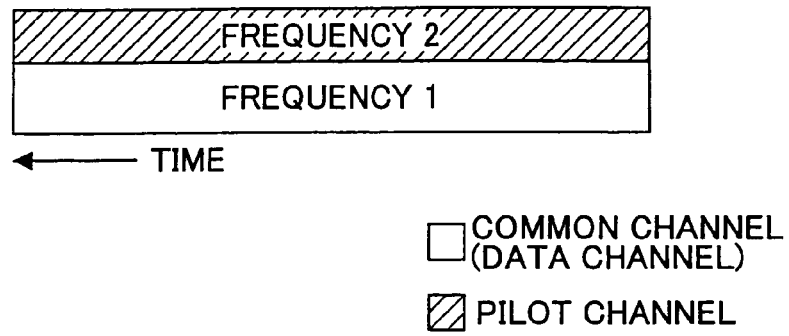
FIG. 41 shows an example of multiplexing a common channel and a pilot channel.
Figure 41B:
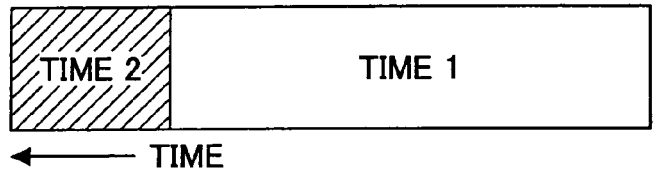
Figure 41C:
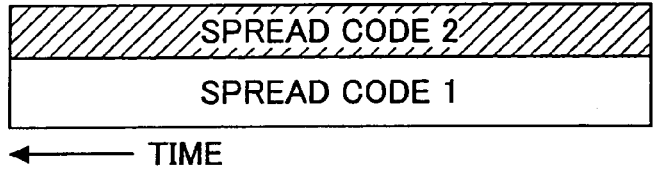
Figure 41D:
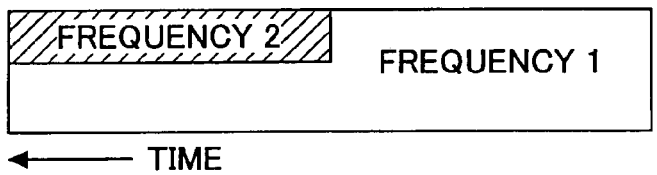
Figure 41E:
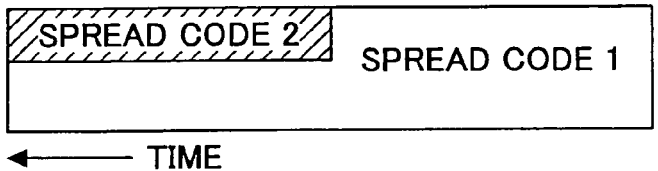

FIG. 41A through FIG. 41E illustrate examples of multiplexing a common channel and a pilot channel. In FIG. 41A, the common channel and the pilot channel are multiplexed using different frequencies. The lateral direction of the channel blocks shown corresponds to the time axis, and the vertical direction (or the height) of the channel blocks corresponds to the power. In FIG. 41B, the common channel and the pilot channel are multiplexed using time slots. In FIG. 41C, the common channel and the pilot channel are multiplexed using different spread codes. In FIG. 41D, the common channel and the pilot channel are multiplexed using different time slots and different frequencies. In FIG. 41E, the common channel and the pilot channel are multiplexed using different time slots and different spread codes.

Figure 42A:
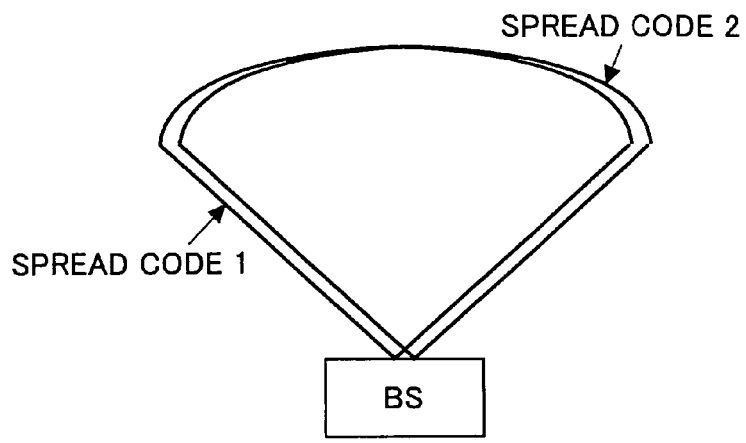
FIG. 42 shows examples of the beam pattern used to transmit the common channel and the pilot channel.
Figure 42B:
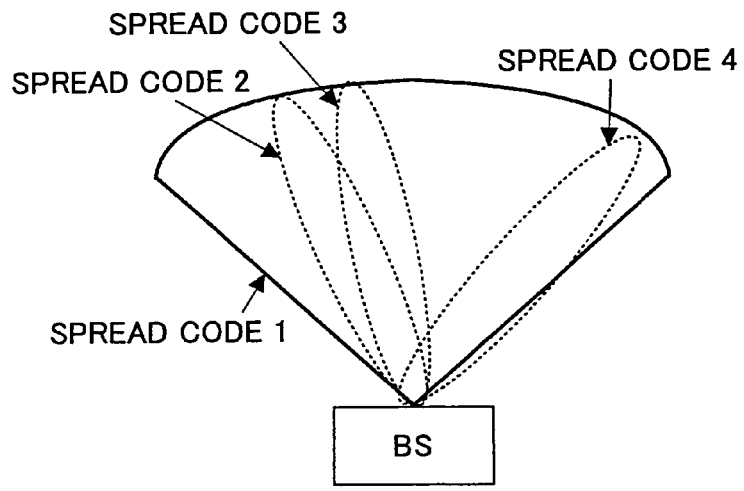
Figure 42C:
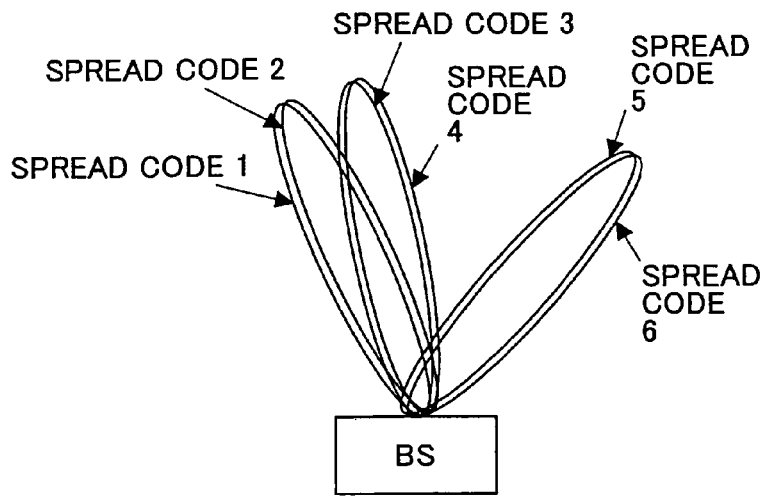

FIG. 42A through FIG. 42C illustrates examples of the beam pattern formed when multiplexing the common channel and the pilot channel. In these examples, the beams are distinguished from each other by different spread codes for facilitating the drawings. These beams can be distinguished by using many other methods described above.

In FIG. 42A, both the common channel and the pilot channel are transmitted using beam patterns for omnidirectional sector transmission. Since the beam patterns of the common channel and the pilot channel are the same, the channel estimation can be performed at high accuracy using the pilot channel. Because only a single pilot is used in the sector, the workload for cell search carried out when turning on the power or conducting handover can be reduced.

In FIG. 42B, one of the common channel and the pilot channel is transmitted using directional beam patterns, and the other is transmitted to the entire area of the sector by omnidirectional sector transmission. Since the beam patterns for the common channel and the pilot channel are different, the common channel and the pilot channel may be transmitted through different channels. To accurately estimate the channels when the pilot channel is transmitted by directional beams, it is advantageous to average the pilot channels from the respective beams. In this case, the user can acquire the common channel easily wherever the user is located in the sector.

Figure 43:
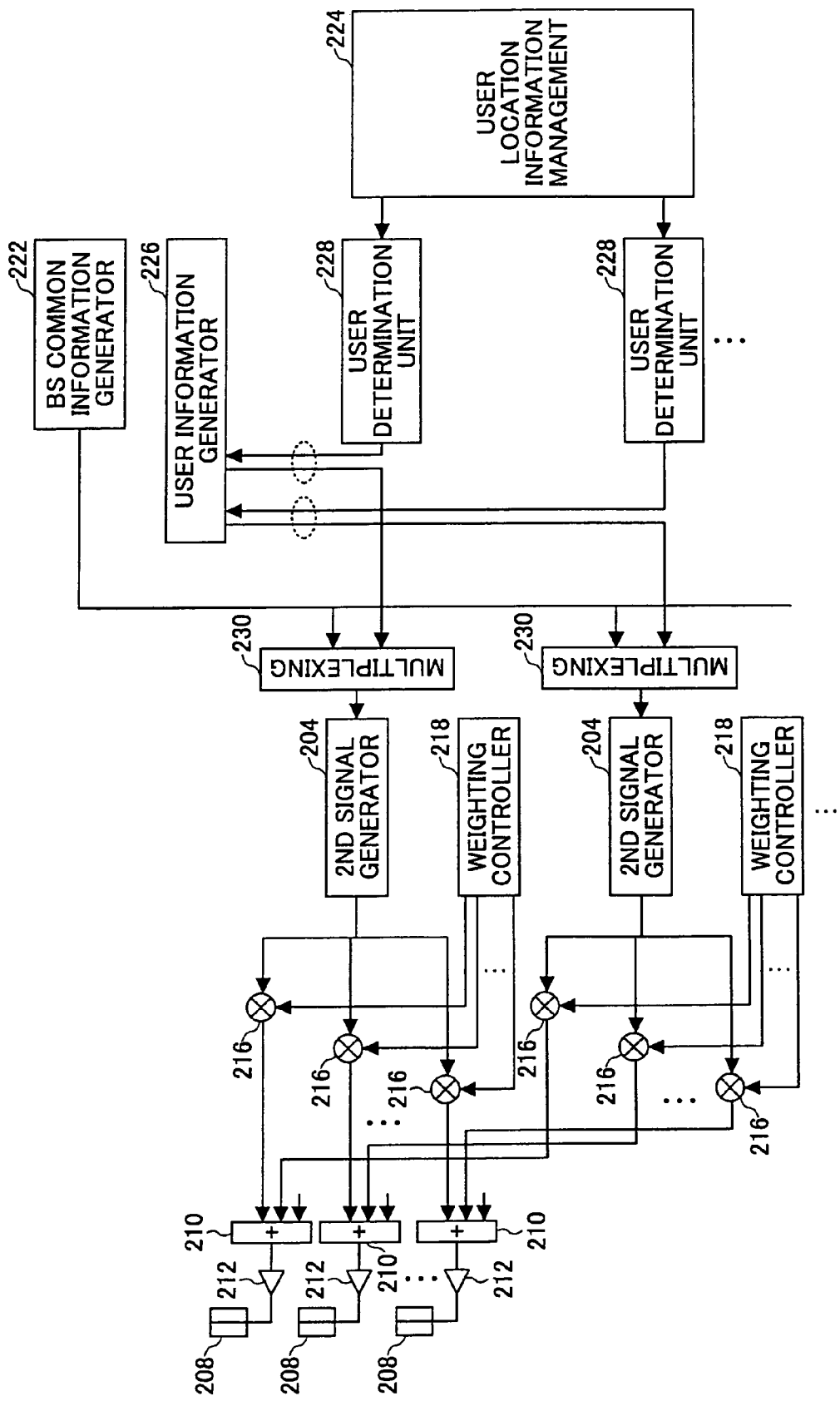
FIG. 43 is a functional block diagram of the signal transmission apparatus according to another embodiment of the invention.

In FIG. 42C, both the common channel and the pilot channel are transmitted using directional beams. Since the beam patterns for the common channel and the pilot channel are the same, similar to FIG. 42A, highly accurate channel estimation can be realized. In addition, since it is not necessary to transmit signals to the entire area of the sector, transmit power can be reduced greatly, and the first transmission signal generator can be eliminated from the signal transmission apparatus. The signals from the base station (BS) common information generator 222 are always supplied to the second transmission signal generators 204, as illustrated in FIG. 43.

From the viewpoint of transmit power saving, the beam pattern illustrated in FIG. 42C is advantageous. However, the user has to obtain information about the spread code used for directional beam transmission in advance, and the workload on the user terminal is greater, as compared with the arrangement shown in FIG. 42A. For example, when turning on the power, the workload required for beam search during the cell search increases. When reduction of workload on the user terminal is required or when users are widely spread in the sector, the beam pattern shown in FIG. 42B is advantageous. It is also advantageous to switch the beam patterns shown in FIG. 42B and FIG. 42C depending on the environment.

Figure 44:
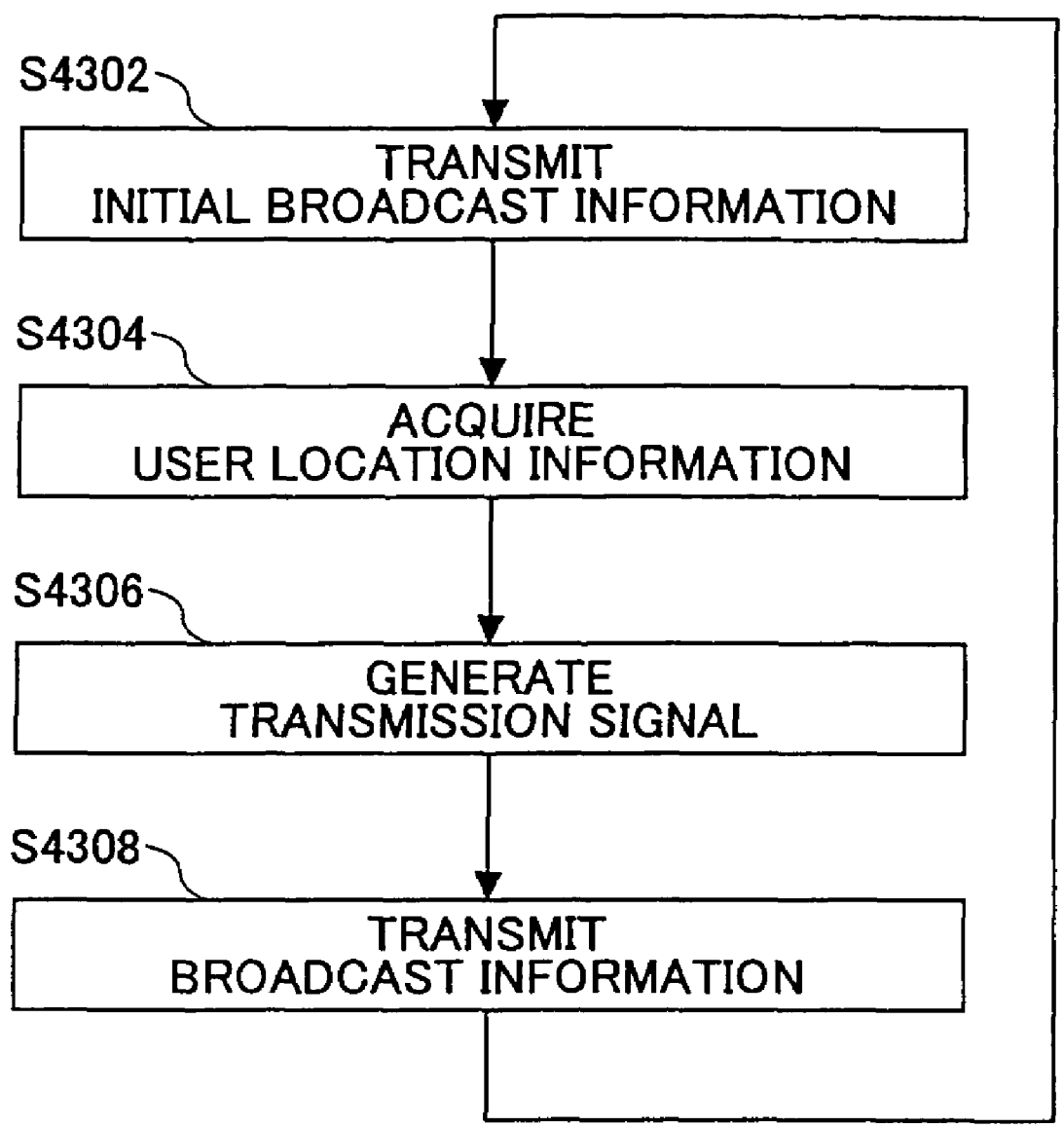
FIG. 44 is a flowchart showing the operation process according to the embodiment of the invention.

FIG. 44 is a flowchart showing the process carried out in the embodiment. In step S4302, the initial broadcast information is transmitted to the entire area of the sector. Referring to FIG. 2, the BS common information generator 222 supplies the initial broadcast information to the first transmission signal generator 202 via the terminal A of switch 220. The output of the first transmission signal generator 202 is weighted for the beam pattern covering the entire area of the sector, and then transmitted from multiple antenna elements 208 (by omnidirectional sector transmission). The initial broadcast information contains information items about frequencies, time slots, and spread codes used to generate directional beams for transmitting the broadcast information, but it does not contain the broadcast information itself. Broadcast information is information about the overall sector, such as BCCH, addressed to all the users located in the sector, and contains, for example, the cell number. In general, the quantity of the initial broadcast information is less than the broadcast information.

In step S4304, location information of a user is acquired. The location information is represented by an angle of direction of the user terminal from the base station. The user location information is managed at the user location information management unit 224. The user location information can be estimated from the arriving direction of the uplink channel from the mobile terminal (user terminal) or the signal intensity. Alternatively, the user location information may be received directly from the mobile terminal. For example, if directional beams θ1, θ2, and θ3 are available at a certain point of time, the base station transmits initial broadcast information (such as frequencies, time slots, or spread codes) required to receive the directional beams θ1, θ2, and θ3. The user captures the initial broadcast information, and selects an appropriate beam (for example, beam θ2) suitable for the current location. The selection result is fed back to the base station, and the base station acquires the location of the mobile terminal (user terminal) directly.

In step S4306, a transmission signal is generated based on the user location information. The location information managed at the user location information management unit 224 is supplied to the user determination units 228 provided so as to correspond to the respective directional beams. Each of the user determination units 228 finds users associated with the beam. Then, the user determination unit 228 requests the user information generator 226 to output information addressed to the user if there is such information. The user information generator 226 outputs the requested information, and supplies it to one of the input terminals of the multiplexing unit 230. The other input terminal of the multiplexing unit 230 receives the broadcast information from the base station (BS) common information generator 222, via the terminal B of switch 220. In this embodiment, the BS common information generator 222 outputs information, the contents of which can be varied depending on which terminal (terminal A or terminal B) the switch 220 is connected to.

In step S4308, the output of each of the second transmission signal generators 204 is weighted so as to realize an appropriate directional beam, supplied to the corresponding antenna element 208, via the corresponding signal synthesizer 210 and the power amplifier 212, and transmitted from the antenna element 208 using the directional beams. Then, the process returns to step S4302 to transmit the initial broadcast information. By alternately performing omnidirectional sector transmission of the initial broadcast information and directional beam transmission of broadcast information, workload for beam search on the user terminal can be reduced, while transmit power of the base station can be saved. Switching operation of the transmission mode may be carried out regularly, or alternatively, it may be performed irregularly depending on demand for it. The quantity of initial broadcast information is small, as compared with broadcast information. Accordingly, even if the base station transmits the initial broadcast information to the entire area of the sector, the transmit power of the base station can be maintained low, as compared with transmission of broadcast information to the sector.

Although in the operation flow shown in FIG. 43 initial broadcast information and a broadcast signal are transmitted alternately, other signals may be transmitted. For example, omnidirectional sector transmission and directional beam transmission may be performed alternately to transmit the common channel, while the pilot channel is transmitted by directional beam. Alternatively, omnidirectional sector transmission of the initial common channel and directional beam transmission of the common channel may be performed alternately, while transmitting the pilot channel using directional beams. The initial common channel contains information required to receive the common channel, and its quantity of information is less than that of the common channel. By alternately performing radio signal transmissions illustrated in FIG. 42B and FIG. 42C, signal transmission advantageous both for the user and the base station is realized.

As has been described above, in transmission of a common channel to a mobile terminal from a base station, omnidirectional transmission to the entire area of the sector is not necessarily required. Without using omnidirectional sector transmission, the common channel is transmitted using directional beams. A signal to be transmitted to an arbitrary mobile terminal belonging to the sector and a signal to be transmitted to a specific mobile terminal located in an area of the sector can be transmitted using a beam pattern that covers only a part of the sector. In this case, the common channel is transmitted to a limited area of the sector, instead of to the entire area of the sector. Consequently, transmit power can be saved. The saved power can be distributed among individual channels, and the system capacity can be increased.

Even if omnidirectional sector transmission is performed to transmit the common channel, the overall transmit power can be reduced by combining directional beam transmission of the common channel with the omnidirectional sector transmission. For example, directional beam transmission of broadcast information can be combined with omnidirectional sector transmission of the initial broadcast information for allowing the user to use the broadcast information. A signal to be transmitted to an arbitrary user located in the sector is transmitted using a beam pattern covering only a part of the sector, while the initial information required to capture that signal is transmitted using a beam pattern covering the entire area of the sector. A signal to be transmitted to a specific mobile terminal located in a part of the sector is transmitted to a beam pattern to cover a portion of the sector. In this manner, the quantity of information transmitted by omnidirectional sector transmission is reduced to save the transmit power.

The above-described transmission technique is applicable to various signal transmissions, such as (1) transmission of information addressed to a user located in a specific area of the sector, and (2) transmission of information addressed to all the users located in the sector. Transmission (1) includes transmission of an individual channel, a common channel to a user located in a specific area, and a common pilot channel about a specific directional beam. Transmission (2) includes transmission of a common channel (containing the initial broadcast information) addressed to all the users, and a common pilot channel about omnidirectional sector transmission. These signals can be appropriately multiplexed. By transmitting two or more multiplexed signals using directional beams, transmit power can be reduced greatly. The signals to be multiplexed can be distinguished from each other by changing all or a part of frequencies, time slots, or spread codes.

In addition to transmission of different information items to the entirety or a part of the sector using directional beams, the same contents of information can be transmitted to the entire area of the sector using multiple directional beams. This arrangement allows the user to receive the information wherever the user is located in the sector, and to recognize in which area of the sector the user is currently located based on the directional beam from which the information is derived.

Figure 45:
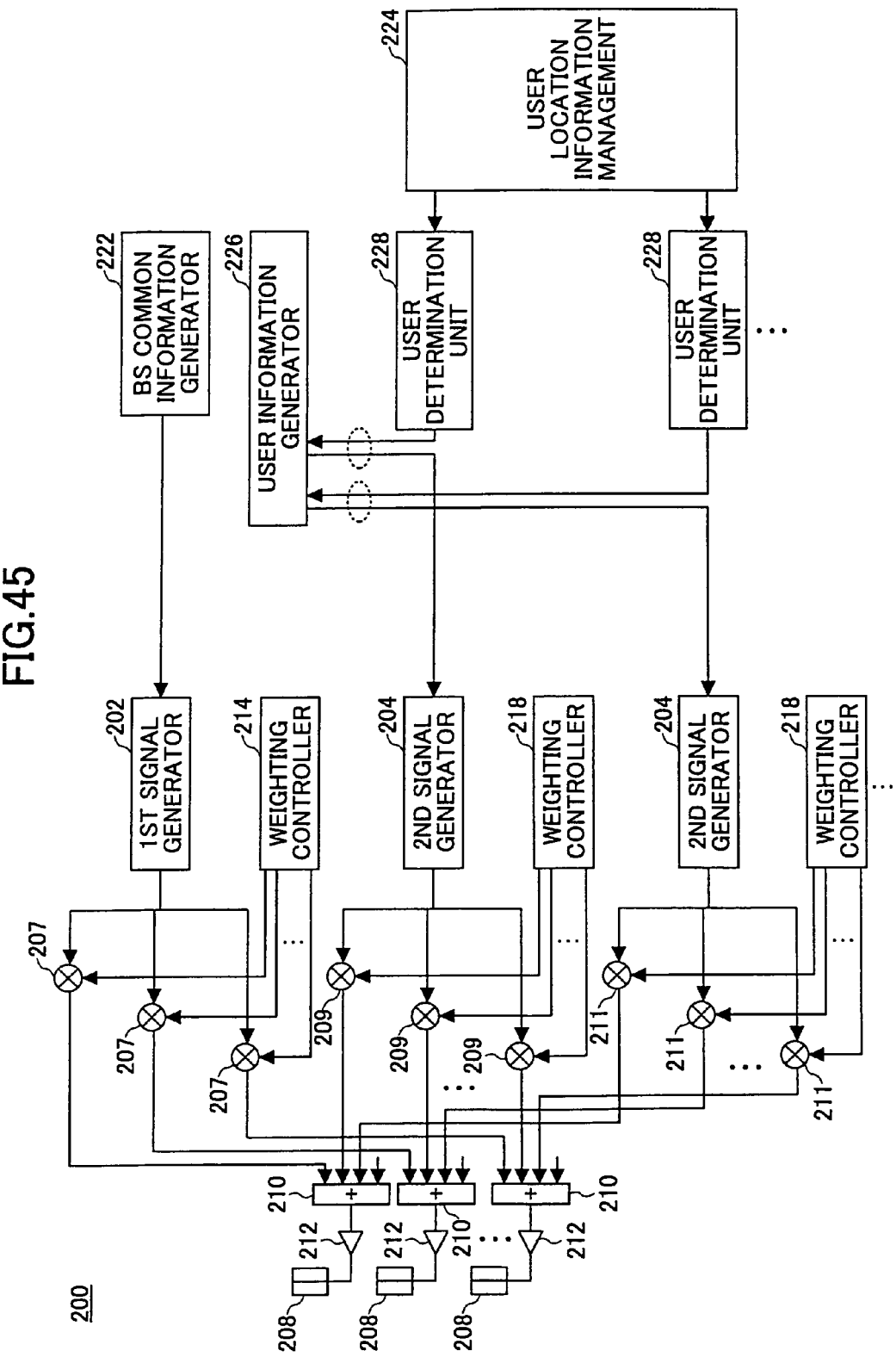
FIG. 45 is a functional block diagram of the signal transmission apparatus according to still another embodiment of the invention.

In the above-described embodiment, the signal from the BS common information generator 222 (FIG. 2 and FIG. 43) and the signal from the user information generator 226 are multiplexed at the multiplexing unit 230 before they are supplied to the second transmission signal generator 204. However, the invention is not limited to this structure. Multiplexing of signals can be carried out at an arbitrary point as long as the multiplexed signal is transmitted from the antenna elements 208. For example, the signals can be multiplexed at signal synthesizers 210, as illustrated in FIG. 45. If the weighting factors adjusted by the weighting adjustors 207, 209, and 211 are all the same, a signal from the BS common information generator 222 and a signal from the user information generator 226 are multiplexed on the directional beam realized by the weighting factors. To distinguish the signals to be multiplexed, the transmission signal generators 202 and 204 perform appropriate orthogonalization, making use of frequencies, time slots, or spread codes. If the weighting factors adjusted by the weighting factor adjustors 209 and 211 are different from each other, and if the directivities of the beams are different, it is preferable to multiplex the signals before the transmission signals are generated, as illustrated in FIG. 2, from the viewpoint of efficiently multiplexing information from the BS common information generator 222 on these directional beams. In order to realize this with the structure shown in FIG. 45, a signal path corresponding to the weighting adjustor 207 has to be provided for each of the directional beams having different directivities.

In the above-described embodiment, the common channel, the pilot channel, and other signals are transmitted in appropriate transmission schemes, depending on the situations (including the location) of the mobile terminal in the sector. Consequently, the overall transmit power can be reduced, and the system capacity can be increased. A pilot signal can be transmitted efficiently by multiplexing the pilot signal on the common channel using one or more beams for omnidirectional sector transmission and/or directional beam transmission. By performing various modes of channel multiplexing, such as multiplexing of the common channel and individual channels, or the common channel and a common pilot channel, transmit power and control channel bandwidth (resources) can be saved.

This patent application is based on and claims the benefit of the earlier filing date of Japanese Patent Application No. 2003-206811 filed Aug. 8, 2003, the entire contents of which are hereby incorporated by reference.

What is claimed is:

1. A signal transmission apparatus for transmitting signals using multiple antenna elements, comprising:
   a first transmission signal generator configured to convert a first signal addressed to all mobile terminals located in a geographical area into a first transmission signal to be transmitted using a wide area beam pattern;
   a second transmission signal generator configured to convert a multiplexed signal into a second transmission signal to be transmitted using a prescribed beam pattern, the multiplexed signal including a signal addressed to a specific mobile terminal located in a part of the geographical area and a second signal addressed to all mobile terminals located in the geographical area, the prescribed beam pattern configured to optimize transmission to the specific mobile terminal relative to the wide area beam pattern;
   a controllable switch configured to switch between a first and a second mode of operations, the first mode of operations including a transmission of the first transmission signal, and the second mode of operations including a transmission of the second transmission signal, the first transmission signal including initial broadcast information describing a plurality of prescribed beam patterns of the second transmission signal, permitting the specific mobile terminal to select a suitable prescribed beam pattern for the specific mobile terminal;
   first and second weighting adjustors, corresponding to the first and second transmission signal generators, respectively, and configured to weight a corresponding one of the first and second transmission signals so that the multiple antenna elements generate the wide area beam pattern and the prescribed beam pattern, respectively; and
   a signal synthesizer provided for each of the antenna elements and configured to synthesize the weighted transmission signals,
   wherein said second transmission signal generator generates the prescribed beam pattern based on a selection of the suitable prescribed beam pattern that has been received from the specific mobile terminal.

2. The signal transmission apparatus of claim 1, wherein the second weighting adjustor is configured to set a weighting factor to define the prescribed beam pattern by averaging weighting factors used for multiple directional beams with different directivities.

3. The signal transmission apparatus of claim 1, wherein the second transmission signal generator is configured to orthogonalize the signal addressed to the specific mobile terminal located in the part of the geographical area and the second signal addressed to all mobile terminals located in the geographical area with at least one of frequency, time slot, and spread code information, before the second transmission signal is transmitted.

4. The signal transmission apparatus of claim 1, further comprising:
   a management unit configured to manage location information of the specific mobile terminal in the geographical area; and
   a user information generator configured to produce the signal addressed to the specific mobile terminal based on the location information of the specific mobile terminal.

5. The signal transmission apparatus of claim 1, further comprising:
   a user determination unit configured to detect a user associated with a specific directional beam based on location information of the specific mobile terminal; and
   a multiplexing unit configured to multiplex the signal addressed to the specific mobile terminal located in the part of the geographical area and the second signal addressed to all mobile terminals to produce the second transmission signal.

6. The signal transmission apparatus of claim 1, wherein the first and second signals addressed to all mobile terminals located in a geographical area include a common channel used in common for multiple mobile terminals or a common pilot channel used to demodulate the common channel.

7. A signal transmission method of transmitting signals via an antenna array having multiple antenna elements, comprising:
   controllably switching between a first and a second mode of operations, the first mode of operations including transmitting a first transmission signal, and the second mode of operations including transmitting a second transmission signal, the first transmission signal including initial broadcast information describing a plurality of prescribed beam patterns of the second transmission signal, permitting a specific mobile terminal to select a suitable prescribed beam pattern for the specific mobile terminal, wherein
   the step of transmitting a first transmission signal includes
   converting a first signal addressed to all mobile terminals located in a geographical area into the first transmission signal,
   weighting the first transmission signal with weights configured to cause the multiple antenna elements to generate a wide area beam pattern,
   transmitting the first transmission signal using the wide area beam pattern, and the step of transmitting the second transmission signal includes
   converting a multiplexed signal into the second transmission signal, the multiplexed signal including a signal addressed to the specific mobile terminal located in a part of the geographical area and a second signal addressed to all mobile terminals located in the geographical area,
   weighting the second transmission signal with weights configured to cause the multiple antenna elements to generate a prescribed beam pattern configured to optimize transmission to the specific mobile terminal relative to the wide area beam pattern, and generating the prescribed beam pattern based on a selection of the suitable prescribed beam pattern that has been received from the specific mobile terminal, and
   transmitting the second transmission signal using the prescribed beam pattern.

8. The signal transmission method of claim 7, said step of converting a multiplexed signal comprising the step of:
   orthogonalizing the signal addressed to the specific mobile terminal located in the part of the geographical area and the second signal addressed to all mobile terminals located in the geographical area using at least one of frequency, time slot, and spread code information.

9. The signal transmission method of claim 7, further comprising the steps of:
   multiplexing the signal addressed to the specific mobile terminal located in the part of the geographical area and the second signal addressed to all mobile terminals to produce the second transmission signal.

10. The signal transmission apparatus according to claim 1, wherein the initial broadcast information includes at least one of a frequency, time slot, or spread code of the plurality of the prescribed beam patterns.

11. The signal transmission method according to claim 7, wherein the initial broadcast information includes at least one of a frequency, time slot, or spread code of the plurality of the prescribed beam patterns.

* * * * *